(12) United States Patent
Rodriguez

(10) Patent No.: US 10,576,903 B2
(45) Date of Patent: Mar. 3, 2020

(54) UPRIGHT BIKE CARRIER

(71) Applicant: Yakima Products, Inc., Lake Oswego, OR (US)

(72) Inventor: Marcos Henry Rodriguez, Portland, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 131 days.

(21) Appl. No.: 15/614,515

(22) Filed: Jun. 5, 2017

(65) Prior Publication Data
US 2017/0349112 A1 Dec. 7, 2017

Related U.S. Application Data

(60) Provisional application No. 62/345,838, filed on Jun. 5, 2016.

(51) Int. Cl.
*B60R 9/10* (2006.01)

(52) U.S. Cl.
CPC .................... *B60R 9/10* (2013.01)

(58) Field of Classification Search
CPC .... B60R 9/10; B60R 9/12; B60R 9/04; B60R 9/048; B60R 9/055; B60R 9/058
See application file for complete search history.

(56) References Cited

U.S. PATENT DOCUMENTS

| | | |
|---|---|---|
| 357,287 A | 2/1887 | Nolte |
| 376,055 A | 1/1888 | Hopkins et al. |
| 993,954 A | 5/1911 | Budlong |
| 1,505,883 A | 8/1924 | Gleason |
| 1,789,458 A | 1/1931 | Bureau |
| 2,248,170 A | 7/1941 | Hansen |
| 2,271,452 A | 1/1942 | Carroll |
| 2,302,300 A | 11/1942 | Davies |
| 2,415,286 A | 2/1947 | Hyde |
| 2,431,400 A | 11/1947 | Iverson |
| 2,536,797 A | 1/1951 | Cooke |
| 2,551,218 A | 5/1951 | Menne |
| 2,573,187 A | 10/1951 | Désilets |

(Continued)

FOREIGN PATENT DOCUMENTS

| | | |
|---|---|---|
| CH | 272137 A | 11/1950 |
| CN | 2445963 Y | 9/2001 |

(Continued)

OTHER PUBLICATIONS

Yakima Products, Inc., Locking Ski Mount Literature, Jan. 1989, 1 page.

(Continued)

*Primary Examiner* — Derek J Battisti
(74) *Attorney, Agent, or Firm* — Kolisch Hartwell, P.C.

(57) ABSTRACT

An upright bicycle carrier may include an elongate base having a pair of parallel rails and a hoop-style wheel capture device. A rear wheel receiver may be adjustably coupled in sliding engagement with a first slot in each of the rails, and a rear crossbar clamp may be adjustably coupled in a second slot in each of the rails, such that the receiver and the clamp are capable of overlapping adjustment ranges. The wheel capture device may include a pair of hoop structures pivotable on a same axis of rotation and securable by a rotatable locking knob.

8 Claims, 16 Drawing Sheets

(56) References Cited

U.S. PATENT DOCUMENTS

| | | |
|---|---|---|
| 2,630,257 A | 3/1953 | Nielsen |
| 2,723,005 A | 11/1955 | Wink |
| 2,729,499 A | 1/1956 | Eggum |
| 2,764,438 A | 9/1956 | Haviland |
| 2,765,016 A | 10/1956 | Parsegian |
| 2,816,672 A | 12/1957 | Facchini |
| 2,840,288 A | 6/1958 | Broddon |
| 2,895,748 A | 7/1959 | Oldham |
| 2,948,560 A | 8/1960 | Rop |
| 2,988,253 A | 6/1961 | Menghi |
| 2,999,378 A | 9/1961 | Blair |
| 3,001,679 A | 9/1961 | Canning et al. |
| 3,005,213 A | 10/1961 | Brown et al. |
| 3,042,240 A | 7/1962 | Cline |
| 3,113,642 A | 12/1963 | Lay |
| 3,116,836 A | 1/1964 | McCauley |
| 3,155,249 A | 11/1964 | Johnson |
| 3,165,353 A | 1/1965 | Weise |
| 3,186,569 A | 6/1965 | Roux |
| 3,190,587 A | 6/1965 | Fries |
| 3,204,839 A | 9/1965 | Yuda et al. |
| 3,239,115 A | 3/1966 | Bott et al. |
| 3,242,704 A | 3/1966 | Barreca |
| 3,258,820 A | 7/1966 | Steinberg |
| 3,276,085 A | 10/1966 | Spranger |
| 3,292,222 A | 12/1966 | Steinberg |
| 3,460,694 A | 8/1969 | Simms |
| 3,460,788 A | 8/1969 | Goldman |
| 3,469,810 A | 9/1969 | Dorris |
| 3,581,962 A | 6/1971 | Osborn |
| 3,596,788 A | 8/1971 | Willie |
| 3,642,157 A | 2/1972 | Williams, Jr. |
| 3,662,435 A | 5/1972 | Allsop |
| 3,668,791 A | 6/1972 | Salzman et al. |
| 3,719,297 A | 3/1973 | Nowicki |
| 3,737,083 A | 6/1973 | Lund |
| 3,740,034 A | 6/1973 | Scroggins |
| 3,777,922 A | 12/1973 | Kirchmeyer |
| 3,826,390 A | 7/1974 | Watson |
| 3,828,993 A | 8/1974 | Carter |
| 3,843,001 A | 10/1974 | Willis |
| 3,848,784 A | 11/1974 | Shimano et al. |
| 3,848,785 A | 11/1974 | Bott |
| 3,861,533 A | 1/1975 | Radek |
| 3,892,455 A | 7/1975 | Sotolongo |
| 3,900,923 A | 8/1975 | Thomas |
| 3,906,593 A | 9/1975 | Caveney et al. |
| 3,922,018 A | 11/1975 | Shook |
| 3,946,917 A | 3/1976 | Crawford et al. |
| 3,976,213 A | 8/1976 | Ball |
| 3,993,167 A | 11/1976 | Reed |
| 3,999,409 A | 12/1976 | Bell |
| 4,021,888 A | 5/1977 | Aimar |
| 4,022,362 A | 5/1977 | Revercomb |
| 4,023,761 A | 5/1977 | Molis |
| 4,028,915 A | 6/1977 | Stahl |
| 4,034,879 A | 7/1977 | Cudmore |
| 4,046,297 A | 9/1977 | Bland |
| 4,058,243 A | 11/1977 | Tappan |
| 4,081,118 A | 3/1978 | Mason |
| 4,085,763 A | 4/1978 | Thomas |
| 4,112,557 A | 9/1978 | Salomon |
| 4,114,409 A | 9/1978 | Scire |
| 4,126,228 A | 11/1978 | Bala et al. |
| 4,193,171 A | 3/1980 | Lichowsky |
| 4,261,496 A | 4/1981 | Mareydt et al. |
| 4,274,569 A | 6/1981 | Winter et al. |
| 4,310,951 A | 1/1982 | Riedel |
| 4,326,320 A | 4/1982 | Riedel |
| 4,326,655 A | 4/1982 | Gradek et al. |
| 4,350,380 A | 9/1982 | Williams |
| 4,358,037 A | 11/1982 | Heideman |
| 4,424,636 A | 1/1984 | Everest |
| 4,437,597 A | 3/1984 | Doyle |
| 4,442,961 A | 4/1984 | Bott |
| 4,453,290 A | 6/1984 | Riedel |
| 4,501,354 A | 2/1985 | Hoffman |
| 4,524,893 A | 6/1985 | Cole |
| 4,547,980 A | 10/1985 | Olivieri |
| 4,553,292 A | 11/1985 | Pradier et al. |
| 4,555,830 A | 12/1985 | Petrini et al. |
| 4,589,622 A | 5/1986 | Hutter |
| 4,596,080 A | 6/1986 | Benoit et al. |
| 4,614,047 A | 9/1986 | Arieh et al. |
| 4,619,122 A | 10/1986 | Simpson |
| 4,621,873 A | 11/1986 | Weinstein et al. |
| 4,624,063 A | 11/1986 | Delery |
| 4,629,104 A | 12/1986 | Jacquet |
| 4,630,990 A | 12/1986 | Whiting |
| 4,646,401 A | 3/1987 | Morell |
| 4,670,946 A | 6/1987 | Olivieri |
| 4,678,147 A | 7/1987 | Barnes et al. |
| 4,683,620 A | 8/1987 | Valsecchi et al. |
| 4,694,666 A | 9/1987 | Bellingham et al. |
| 4,700,873 A | 10/1987 | Young |
| 4,702,401 A | 10/1987 | Graber et al. |
| 4,717,165 A | 1/1988 | Johnson |
| 4,724,692 A | 2/1988 | Turin et al. |
| 4,727,630 A | 3/1988 | Alan |
| 4,728,019 A | 3/1988 | Olliges |
| 4,735,350 A | 4/1988 | Kamaya |
| 4,751,891 A | 6/1988 | Wilson |
| 4,759,137 A | 7/1988 | Lederer |
| 4,761,859 A | 8/1988 | Calabrigo |
| 4,761,898 A | 8/1988 | Courvoisier et al. |
| 4,763,957 A | 8/1988 | Poehlmann et al. |
| 4,770,011 A | 9/1988 | Constant |
| 4,789,206 A | 12/1988 | Ozaki |
| 4,796,337 A | 1/1989 | Marxer |
| 4,817,838 A | 4/1989 | Kamaya |
| 4,830,249 A | 5/1989 | Mirenda et al. |
| 4,842,148 A | 6/1989 | Bowman |
| 4,848,794 A | 7/1989 | Mader et al. |
| 4,875,608 A | 10/1989 | Graber |
| 4,887,754 A | 12/1989 | Boyer et al. |
| 4,892,279 A | 1/1990 | Lafferty et al. |
| 4,912,817 A | 4/1990 | Sandreid |
| 4,934,572 A | 6/1990 | Bowman et al. |
| 4,951,487 A | 8/1990 | Sheils Dennis |
| 4,960,356 A | 10/1990 | Wrenn |
| 4,961,524 A | 10/1990 | Hunts |
| 4,964,287 A | 10/1990 | Gaul |
| 4,976,123 A | 12/1990 | Ceron et al. |
| 4,997,332 A | 3/1991 | Johnson |
| 5,003,711 A | 4/1991 | Nerrinck et al. |
| 5,005,390 A | 4/1991 | Giannini et al. |
| 5,007,260 A | 4/1991 | Sharp |
| 5,009,350 A | 4/1991 | Schill et al. |
| 5,022,672 A | 6/1991 | Kawai |
| 5,025,932 A | 6/1991 | Jay |
| 5,027,628 A | 7/1991 | De Rocher et al. |
| 5,037,019 A | 8/1991 | Sokn |
| 5,042,705 A | 8/1991 | Johansson |
| 5,052,605 A | 10/1991 | Johansson |
| 5,065,921 A | 11/1991 | Mobley |
| 5,067,644 A | 11/1991 | Coleman |
| 5,083,350 A | 1/1992 | Sandreid |
| 5,118,020 A | 6/1992 | Piretti |
| 5,118,125 A | 6/1992 | Plunkett |
| 5,119,654 A | 6/1992 | Ceron et al. |
| 5,119,980 A | 6/1992 | Grim et al. |
| 5,123,147 A | 6/1992 | Blair |
| 5,131,669 A | 7/1992 | Kinnamon et al. |
| 5,135,330 A | 8/1992 | Chen |
| 5,136,709 A | 8/1992 | Shirakabe et al. |
| 5,137,195 A | 8/1992 | Walter |
| 5,165,762 A | 11/1992 | Phillips |
| 5,169,044 A | 12/1992 | Englander |
| 5,172,454 A | 12/1992 | Martignago |
| 5,193,254 A | 3/1993 | Geisinger |
| 5,215,233 A | 6/1993 | Baldeck |
| 5,217,149 A | 6/1993 | Simonett |
| 5,226,341 A | 7/1993 | Shores |
| 5,226,570 A | 7/1993 | Pedrini |

(56) References Cited

U.S. PATENT DOCUMENTS

| | | |
|---|---|---|
| 5,230,449 A | 7/1993 | Collins et al. |
| 5,232,134 A | 8/1993 | Allen |
| 5,244,101 A | 9/1993 | Palmer et al. |
| 5,253,792 A | 10/1993 | Foster et al. |
| 5,275,319 A | 1/1994 | Ruana |
| 5,275,320 A | 1/1994 | Duemmler |
| 5,284,282 A | 2/1994 | Mottino |
| 5,288,001 A | 2/1994 | Locarno |
| 5,291,763 A | 3/1994 | Cuisinot |
| 5,314,104 A | 5/1994 | Lee |
| 5,346,355 A | 9/1994 | Riemer |
| 5,357,690 A | 10/1994 | Ho |
| 5,360,150 A | 11/1994 | Praz |
| 5,362,173 A | 11/1994 | Ng |
| 5,388,938 A | 2/1995 | Helton |
| 5,390,840 A | 2/1995 | Arvidsson |
| 5,416,952 A | 5/1995 | Dodge |
| 5,416,957 A | 5/1995 | Renzi, Sr. et al. |
| 5,419,479 A | 5/1995 | Evels et al. |
| 5,426,826 A | 6/1995 | Takimoto |
| 5,435,475 A | 7/1995 | Hudson et al. |
| 5,442,840 A | 8/1995 | Ewald |
| 5,445,300 A | 8/1995 | Eipper et al. |
| 5,456,396 A | 10/1995 | Allen |
| 5,456,397 A | 10/1995 | Pedrini |
| 5,492,258 A | 2/1996 | Brunner |
| 5,499,430 A | 3/1996 | Strazar |
| 5,511,894 A | 4/1996 | Ng |
| 5,516,017 A | 5/1996 | Arvidsson |
| 5,526,555 A | 6/1996 | Battistella et al. |
| 5,526,971 A | 6/1996 | Despain |
| 5,535,930 A | 7/1996 | Lee |
| 5,549,231 A | 8/1996 | Fletcher et al. |
| 5,570,825 A | 11/1996 | Cona |
| 5,573,165 A | 11/1996 | Bloemer et al. |
| 5,582,044 A | 12/1996 | Bolich |
| 5,598,959 A | 2/1997 | Lorensen et al. |
| 5,617,617 A | 4/1997 | Gustin |
| 5,628,336 A | 5/1997 | Lee |
| 5,647,522 A | 7/1997 | Routh |
| 5,692,659 A | 12/1997 | Reeves |
| 5,697,629 A | 12/1997 | Guild |
| 5,701,628 A | 12/1997 | Morad |
| 5,738,258 A | 4/1998 | Farrow et al. |
| 5,745,959 A | 5/1998 | Dodge |
| 5,752,298 A | 5/1998 | Howell |
| 5,769,291 A | 6/1998 | Chasan |
| 5,769,292 A * | 6/1998 | Cucheran .............. B60R 9/045 224/319 |
| 5,775,557 A | 7/1998 | Arvidsson |
| 5,779,116 A | 7/1998 | Rosch et al. |
| 5,779,119 A | 7/1998 | Talbot et al. |
| 5,810,226 A | 9/1998 | Lee |
| 5,820,002 A | 10/1998 | Allen |
| 5,833,074 A | 11/1998 | Phillips |
| 5,845,827 A | 12/1998 | Reising |
| 5,845,828 A | 12/1998 | Settelmayer |
| 5,862,966 A | 1/1999 | Mehls |
| 5,868,621 A | 2/1999 | Parsons |
| 5,944,198 A | 8/1999 | Ihalainen |
| 5,951,231 A | 9/1999 | Allen |
| 5,988,403 A | 11/1999 | Robideau |
| 5,992,645 A | 11/1999 | West |
| 5,992,805 A | 11/1999 | Tanner |
| 5,996,736 A | 12/1999 | Stankiewicz |
| 6,015,074 A | 1/2000 | Snavely et al. |
| 6,053,336 A | 4/2000 | Reeves |
| 6,079,601 A | 6/2000 | Murray |
| 6,112,965 A | 9/2000 | Lundgren |
| 6,131,781 A | 10/2000 | Murray |
| 6,164,507 A | 12/2000 | Dean et al. |
| 6,189,868 B1 | 2/2001 | Santelli, Jr. |
| 6,193,252 B1 | 2/2001 | Lin |
| 6,244,483 B1 | 6/2001 | McLemore et al. |
| 6,283,310 B1 | 9/2001 | Dean et al. |
| 6,357,643 B1 | 3/2002 | Janner et al. |
| 6,385,822 B1 | 5/2002 | Dean et al. |
| D460,401 S | 7/2002 | Andersson |
| 6,422,441 B1 | 7/2002 | Settelmayer et al. |
| 6,439,397 B1 | 8/2002 | Reeves |
| 6,460,743 B2 | 10/2002 | Edgerly et al. |
| 6,494,351 B1 | 12/2002 | Dean |
| 6,561,398 B1 | 5/2003 | Cole et al. |
| 6,622,898 B1 | 9/2003 | Wang |
| 6,648,300 B2 | 11/2003 | Chamoun |
| 6,681,971 B2 | 1/2004 | Laverack et al. |
| 6,769,292 B2 | 8/2004 | Mansky et al. |
| 6,793,186 B2 | 9/2004 | Pedersen |
| 6,868,998 B2 | 3/2005 | Dean |
| 6,918,521 B2 | 7/2005 | Settelmayer et al. |
| 6,972,042 B2 | 12/2005 | Benson |
| 7,000,811 B2 | 2/2006 | Gilstrap et al. |
| 7,036,698 B2 | 5/2006 | Allen |
| 7,044,347 B1 | 5/2006 | Pedrini |
| 7,051,909 B2 | 5/2006 | Gibson |
| 7,108,163 B1 | 9/2006 | Pedrini |
| 7,131,561 B2 | 11/2006 | Humes |
| 7,234,617 B2 | 6/2007 | Weaver et al. |
| 7,297,570 B2 | 11/2007 | Kim |
| 7,416,098 B2 | 8/2008 | Settelmayer et al. |
| 7,726,528 B2 | 6/2010 | Foley |
| 8,020,737 B2 | 9/2011 | Sweeney |
| 8,021,169 B1 | 9/2011 | Smith |
| 8,136,708 B2 | 3/2012 | Sautter et al. |
| 8,136,709 B2 | 3/2012 | Jeli et al. |
| 8,245,893 B2 | 8/2012 | Sautter et al. |
| 8,720,958 B2 * | 5/2014 | Flannery ................. E06B 9/04 292/288 |
| 8,763,870 B2 | 7/2014 | Davis |
| 9,283,884 B2 | 3/2016 | Sautter et al. |
| 2002/0125282 A1 | 9/2002 | Laverack et al. |
| 2003/0071097 A1 | 4/2003 | Dean |
| 2003/0146257 A1 | 8/2003 | Dean |
| 2005/0077335 A1 | 4/2005 | Bourne |
| 2005/0145639 A1 | 7/2005 | Viklund et al. |
| 2005/0205626 A1 | 9/2005 | Dean |
| 2006/0000859 A1 | 1/2006 | Frischer |
| 2006/0237500 A1 | 10/2006 | Settelmayer |
| 2006/0273122 A1 | 12/2006 | Bogoslofski et al. |
| 2006/0273124 A1 | 12/2006 | Bogoslofski |
| 2006/0289577 A1 | 12/2006 | Malone |
| 2007/0164065 A1* | 7/2007 | Davis ..................... B60R 9/048 224/324 |
| 2007/0235489 A1* | 10/2007 | Jeli ......................... B60R 9/12 224/558 |
| 2008/0029563 A1 | 2/2008 | Malone |
| 2008/0164292 A1 | 7/2008 | Farney |
| 2008/0193265 A1 | 8/2008 | Sautter et al. |
| 2009/0120982 A1 | 5/2009 | Sautter et al. |
| 2010/0078454 A1 | 4/2010 | Sautter et al. |
| 2011/0132946 A1* | 6/2011 | Sautter ................... B60R 9/045 224/324 |
| 2011/0139838 A1 | 6/2011 | Sautter et al. |
| 2011/0139841 A1* | 6/2011 | Sautter ................... B60R 9/045 224/324 |
| 2013/0175308 A1 | 7/2013 | Sautter et al. |
| 2013/0270412 A1* | 10/2013 | Bogoslofski ............ B60R 9/048 248/551 |
| 2014/0124551 A1* | 5/2014 | Condon ................... B60R 9/10 224/324 |
| 2014/0143990 A1* | 5/2014 | Sautter ................... B60R 9/052 24/68 CD |
| 2016/0362053 A1 | 12/2016 | Sautter et al. |
| 2016/0362061 A1* | 12/2016 | Elliott ..................... B60R 9/058 |

FOREIGN PATENT DOCUMENTS

| | | |
|---|---|---|
| CN | 201677818 U | 12/2010 |
| DE | 2556352 A1 | 6/1977 |
| DE | 2940095 A1 | 4/1981 |
| DE | 3034750 A1 | 4/1982 |
| DE | 8801618 U1 | 6/1988 |
| DE | 3912692 A1 | 11/1989 |

(56) References Cited

FOREIGN PATENT DOCUMENTS

| | | |
|---|---|---|
| DE | 4229268 A1 | 3/1994 |
| DE | 20007760 U1 | 8/2000 |
| DE | 20309766 U1 | 9/2003 |
| EP | 0019873 B1 | 10/1982 |
| EP | 0482650 A1 | 4/1992 |
| EP | 0511179 A1 | 10/1992 |
| EP | 0894672 A1 | 2/1999 |
| EP | 1442940 A1 | 8/2004 |
| FR | 1400231 A | 5/1965 |
| FR | 2221329 A1 | 10/1974 |
| FR | 2332155 A1 | 6/1977 |
| FR | 2481209 A1 | 10/1981 |
| FR | 2501601 A1 | 9/1982 |
| FR | 2519305 A1 | 7/1983 |
| FR | 2600953 A1 | 1/1988 |
| FR | 2624808 A2 | 6/1989 |
| FR | 2633569 A1 | 1/1990 |
| FR | 2711346 A1 | 4/1995 |
| GB | 886743 A | 1/1962 |
| GB | 2257463 A | 1/1993 |
| JP | 2000318538 A | 11/2000 |
| WO | 9624509 A1 | 8/1996 |
| WO | 9638336 A1 | 12/1996 |
| WO | 9702976 A1 | 1/1997 |
| WO | 9810959 A1 | 3/1998 |
| WO | 0138141 A1 | 5/2001 |
| WO | 2004076237 A1 | 9/2004 |
| WO | 2005021332 A1 | 3/2005 |
| WO | 2009158360 A1 | 12/2009 |
| WO | 2010141944 A1 | 12/2010 |
| WO | 2010144369 A1 | 12/2010 |
| WO | 2010148011 A1 | 12/2010 |

OTHER PUBLICATIONS

Yakima Products, Inc., The New Yakima Over-Center Wheel Strap Literature, Jan. 1989, 1 page.
Rack Attack Portland's Blog, "Another hit from Yakima! The all new factory-compatible FrontLoader upright bike rack", Mar. 29, 2010, Retrieved from the Internet on Oct. 11, 2012, URL:http://rackattackportland.wordpress.com/2010/03/29/another-hit-from-yakima-the-all-new-factory-compatible-frontloader-upright-bike-rack/, 3 pages.
ORS Racks Direct.com, "Yakima FrontLoader Bike Rack Review Video by ORS Racks Direct", May 19, 2010, Retrieved from the Internet on Oct. 11, 2012, URL:http://www.youtube.com/watch?v=cu8rHM90Rdw, 9 pages.
Carracks Blogspot, "Yakima FrontLoader upright bike rack review", Apr. 17, 2010, Retrieved from the Internet on Oct. 11, 2012, URL:http://carracks.blogspot.nl/2010/04/yakima-frontloader-upright-bike-rack.html, 2 pages.
Heinlen, Jerry, "Yakima FrontLoader Recall Information", Apr. 28, 2011, Retrieved from the Internet on Oct. 11, 2012, URL:http://flrecall.yakima.com, 2 pages.
Yakima, "FrontLoader", Oct. 11, 2012, Retrieved from the Internet on Oct. 11, 2012, URL:http://yakima.com/shop/bike/roof/frontloader#pr-header-8002103, 5 pages.
The International Bureau of WIPO, International Preliminary Report on Patentability regarding PCT Patent Application No. PCT/US2017/036008, dated Dec. 20, 2018, 7 pages.

* cited by examiner

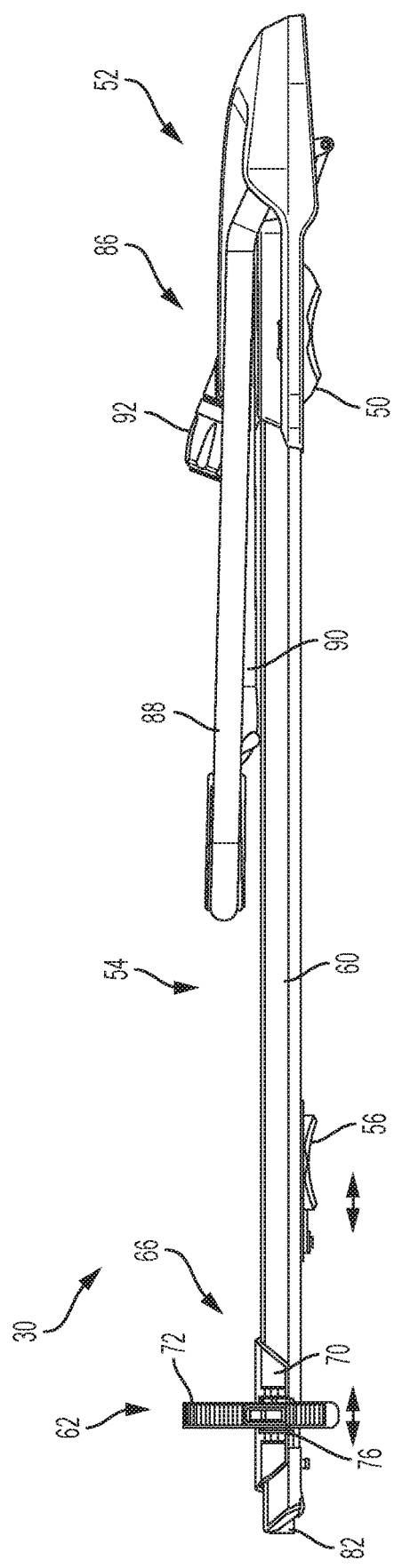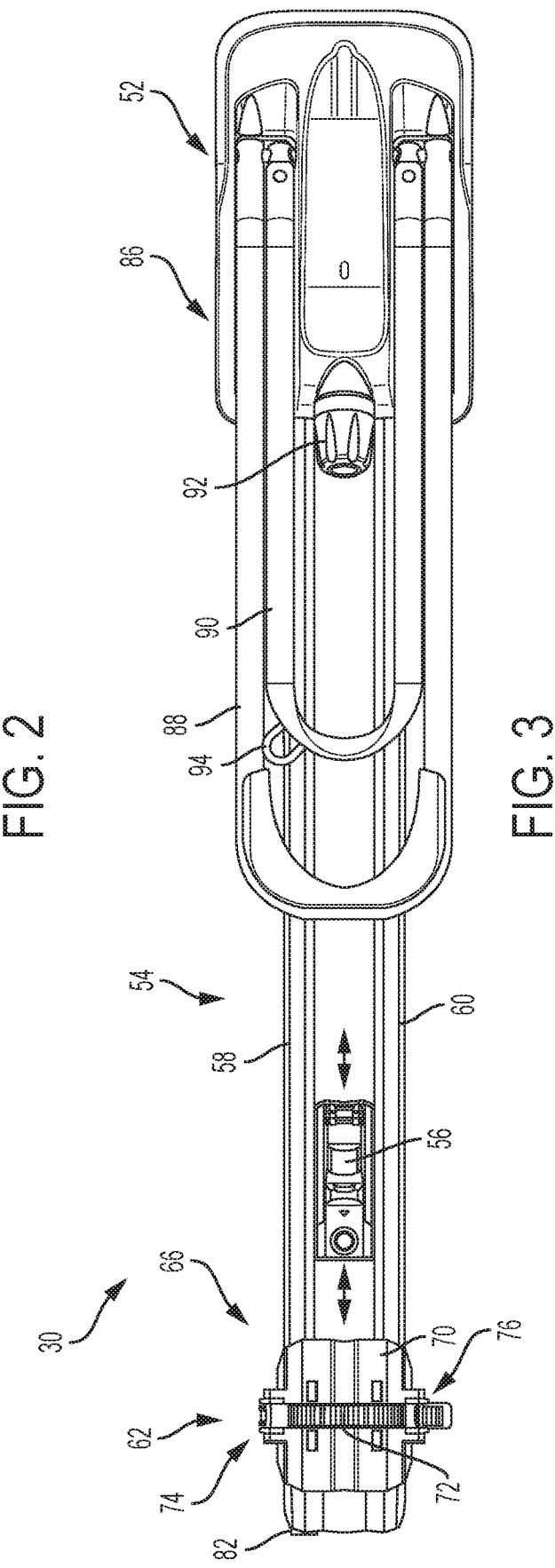

UPRIGHT BIKE CARRIER

CROSS-REFERENCES

This application claims the benefit under 35 U.S.C. § 119(e) of the priority of U.S. Provisional Patent Application Ser. No. 62/345,838, filed Jun. 5, 2016, the entirety of which is hereby incorporated by reference for all purposes.

The following related applications and materials are incorporated herein, in their entireties, for all purposes: U.S. Pat. No. 8,763,870.

INTRODUCTION

Bike mounts have been used for many years to transport bikes on vehicles. For example, bikes may be secured to vehicle roof tops, trunks, hatchbacks, trailers, and truck beds.

In recent years bike styles and designs have changed drastically. What used to be a single standard bike frame design was replaced with a myriad of different frame styles. The materials used to construct bike frames has also become highly varied. Frames are made of various metal alloys, steel, aluminum, titanium, and carbon fiber materials.

Bike mounts require mechanisms to securely fasten a bike to a rack. Sometimes the fastener grips the bike frame. However, a problem with gripping the frame is that the same fastener may not work adequately for certain frame geometries. Another problem is that some frame materials such as aluminum or carbon fiber may be susceptible to damage due to tight clamping forces.

In other bike mounts a fastener primarily grips the wheels of a bike. This type of fastener is advantageous because, unlike bike frame configurations, wheel dimensions tend to remain more standardized. Wheel gripping bike mounts also avoid potentially damaging gripping forces on a bike frame.

Prior wheel gripping bike mounts have had problems relating to security, ease of use, and other issues. Wheel gripping bike mounts for the top of a vehicle require a fastening mechanism that can be operated at a relatively low level since a person standing on the side of the vehicle may not be able to reach much higher than the top of the vehicle roof.

SUMMARY

The present disclosure provides systems, apparatuses, and methods relating to bicycle carriers and other accessories mountable on vehicle racks.

In some embodiments, an upright bicycle carrier may include: an elongate base having a first end portion, a second end portion, and a pair of rails running generally parallel to a long axis of the base between the first end portion and the second end portion, each of the rails having an upper slot and a lower slot, each of the slots running along a respective length of the rail; a first bicycle mounting device coupled to the first end portion of the base and configured to secure a first portion of a bicycle to the bicycle carrier; a first crossbar clamp coupled to the base adjacent the first bicycle securing device, the first crossbar clamp configured to clamp onto a first crossbar mounted to a vehicle rooftop; a wheel receiver adjustably coupled to at least one of the upper slots of the pair of rails and configured to secure a wheel of the bicycle to the bicycle carrier; and a second crossbar clamp adjustably coupled to at least one of the lower slots of the pair of rails and configured to clamp a second crossbar mounted to the vehicle rooftop; wherein the wheel receiver and the second crossbar clamp are adjustable along an overlapping range of positions with respect to the pair of rails.

In some embodiments, an upright bicycle mount may include: an elongate base having a first end portion, a second end portion, and a pair of rails running generally parallel to a long axis of the base between the first end portion and the second end portion; a first clamp device coupled to the base and configured to clamp a first crossbar disposed on a vehicle; and a wheel-capture device coupled to the first end portion of the base, the wheel-capture device including: a first hoop structure pivotal around an axle between a stowed position generally parallel to the base, and a use position generally upright for cradling a bicycle wheel, a second hoop structure fixed to and pivotal with the axle between a stowed position generally parallel to the base, and a use position generally upright for cradling the bicycle wheel, a lever arm fixed to the axle and extending downward through an opening in the base; a threaded member having a first end portion and a second end portion, the first end portion of the threaded member being pivotally coupled to a distal end of the lever arm, the second end portion of the threaded member being threaded and extending generally upward through the opening in the base, and a locking knob having a hole with internal threads engaging the threaded end portion of the threaded member, the threaded member and the second hoop structure configured such that pivoting the second hoop structure upward causes the threaded member to move rearward toward the second end portion of the base; and an abutment plate coupled to the base and against which the locking knob is configured to be tightened, such that the threaded member is prevented from moving forward, thereby maintaining a position of the second hoop structure.

In some embodiments, a clamp device for connecting a rack accessory to a crossbar on top of a vehicle may include: a body including a first end portion, a second end portion, an upper portion, and a lower portion having a cushioned concave surface configured to contact a top side of the crossbar; a threaded rod rotatably coupled to the upper portion of the body, the threaded rod having a dial manipulable to rotate the rod, and a traveling member in threaded engagement with the rod; a flexible strap having an effective length and a proximal end coupled to the traveling member such that the flexible strap is coupled to the first end portion of the body; a distal end of the flexible strap coupled to a lever plate having a transverse shaft portion; the second end portion of the body including a slot configured to receive the shaft portion of the lever plate, such that the lever plate is releasably engageable with the second end portion; and a cover plate coupled to the first end portion of the body, the cover plate being slidable along the body between a first position and a second position; wherein rotation of the dial causes alteration of the effective length of the flexible strap; wherein the lever plate is pivotably transitionable, when the shaft portion is seated in the slot, between an open position and a closed position, such that transitioning from the open position to the closed position causes a decrease in the effective length of the flexible strap; and wherein the cover plate blocks the lever plate from opening when the lever plate is in the closed position and the cover plate is in the first position, such that the lever plate is prevented by the cover plate from transitioning to the open position until the cover plate is in the second position.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 2 is a side elevation view of the upright bicycle carrier of FIG. 1, having a wheel capture device with hoop structures in a stowed position.

FIG. 3 is a top plan view of the upright bicycle carrier of FIG. 2.

DESCRIPTION

Figure 1:
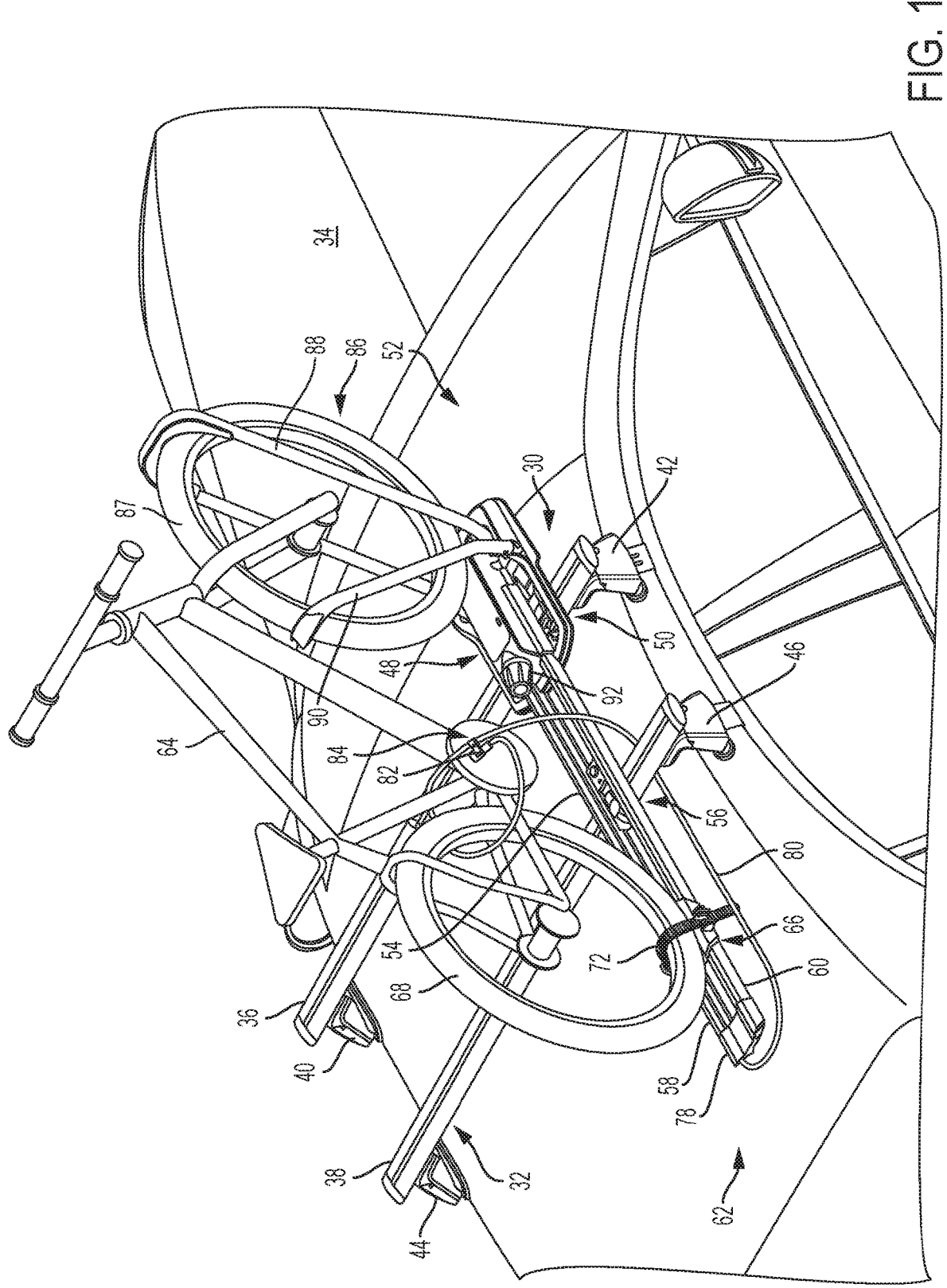
FIG. 1 is an isometric view of an illustrative upright bicycle carrier in accordance with aspects of the present disclosure, mounted on a vehicle rooftop and carrying a bicycle thereon.

Various aspects and examples of an upright bicycle carrier having a front wheel capture device, as well as related systems and methods, are described below and illustrated in the associated drawings. Unless otherwise specified, an upright bicycle carrier according to the present teachings, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "inboard," "outboard," "forward," and "rear" (and the like) are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rear" means toward the rear of the vehicle. In the absence of a host vehicle, the same directional terms may be used as if the vehicle were present. For example, even when viewed in isolation, a crossbar may have a "forward" edge, based on the fact that the edge in question would be installed based on the fact that the crossbar would be installed with the edge in question facing in the direction of the front portion of the host vehicle.

"Coupled" means connected, either permanently or releasably, whether directly or indirectly through intervening components.

Overview

In general, an upright bicycle carrier according to the present teachings may include an elongate base having a first end portion, a second end portion, and a pair of rails running generally parallel to a long axis of the base. The carrier may be clamped to a crossbar of a vehicle rack by at least one crossbar clamp coupled to the base. A front wheel capture device may be coupled to the first end portion of the base, for receiving a front wheel of a bicycle. As described further below, the front wheel capture device may include a pair of hoops pivotable on a same axis between stowed positions generally parallel to the base, and use positions generally upright for cradling the bicycle wheel. A lever arm may be fixed to the axle and extend downward through an opening in the base. A threaded member may have a first end portion pivotally coupled to a distal end of the lever arm, and a second end portion that is threaded and extends generally upward through the opening in the base. A locking knob may include a hole with internal threads engaging the threaded end portion of the threaded member. The threaded member and actuator may be configured such that threads of the threaded member are visibly exposed when the second hoop structure is pivoted upward, causing the threaded member to move rearward toward the second end portion of the base. The carrier further includes an abutment plate coupled to the base and against which the locking knob is configured to be tightened, thereby preventing the second hoop from lowering. In some examples, a spring wire may be coupled to the abutment plate and configured to contact the threads of the threaded member, biasing the threaded member against axial movement and holding the second hoop in place.

Figure 4:
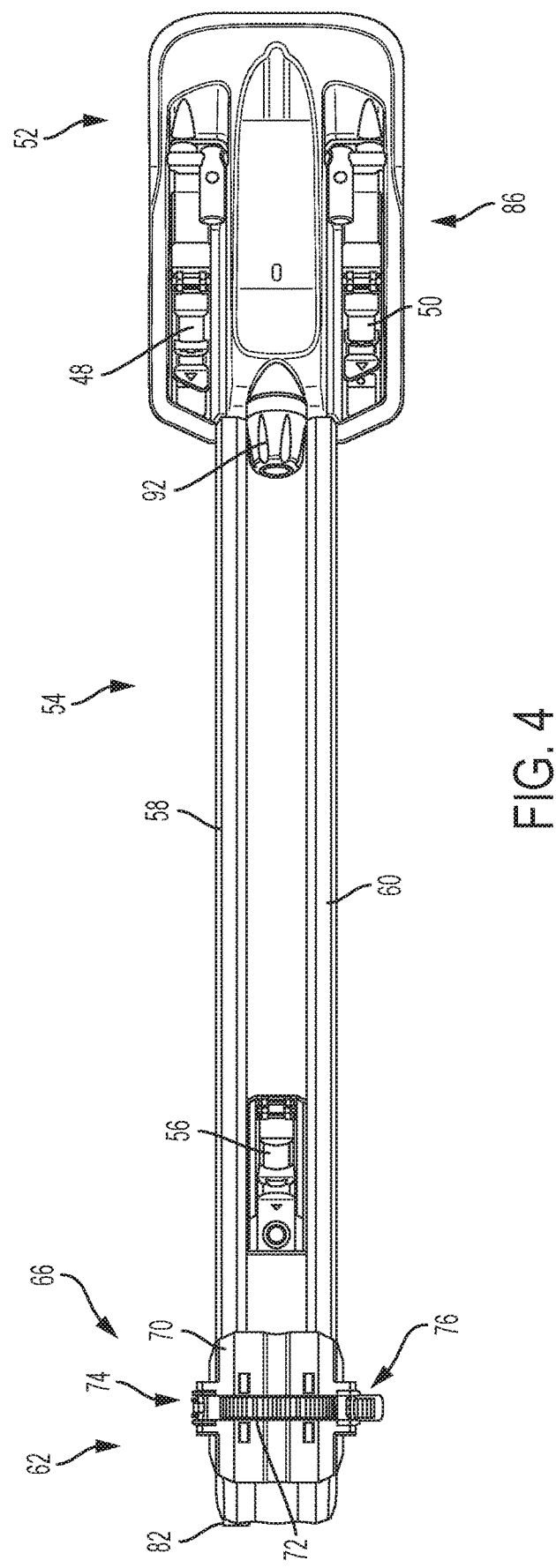
FIG. 4 is another top plan view of the upright bicycle carrier of FIG. 2, with hoop structures removed to facilitate viewing of underlying components.

FIGS. 1-4 depict an illustrative upright bicycle carrier 30. FIG. 1 shows the carrier mounted to an illustrative vehicle, FIG. 2 is a side elevation view, and FIGS. 3 and 4 are overhead plan views, with hoop structures removed in FIG. 4 to facilitate better viewing of the front crossbar clamps.

FIGS. 1 and 2 depict fork-mount upright bicycle carrier 30 mounted to a rack 32 on a vehicle 34. Rack 32 includes a pair of crossbars (front crossbar 36 and rear crossbar 38) attached to vehicle 34 by a first pair of crossbar-to-vehicle couplers 40, 42 and a second pair of crossbar-to-vehicle couplers 44, 46, respectively, as shown in FIG. 1. Carrier 30 is clamped to front crossbar 36 by two front crossbar clamps 48 and 50 fixedly coupled to a front end portion 52 of an elongate base 54 of carrier 30. Carrier 30 is also clamped to rear crossbar 38 by a rear crossbar clamp 56 coupled to a pair of rails 58, 60 running generally parallel to a long axis of the base between the front end portion 52 and a rear end portion 62.

A bicycle 64 may be supported in a secure manner on carrier 30, as depicted in FIG. 1. For this purpose, carrier 30 includes a rear wheel receiver 66 for securing a rear wheel 68 of bicycle 64 to base 54. Rear wheel receiver 66 may include any suitable device configured to releasably mount rear wheel 68 to carrier 30. In this example, rear wheel receiver 66 includes a wheel support plate 70 and a ratcheting wheel strap 72 securable to the support plate by lateral buckles 74, 76.

Bicycle 64 may include any suitable bicycle, such that a length of the bicycle may vary from example to example. Similarly, vehicle 34 may comprise any suitable vehicle, such that vehicle shapes and sizes may vary from example to example. For those reasons, crossbars 36 and 38 may be spaced differently depending on the vehicle, and rear wheel receiver 66 may be positioned differently along rails 58 and 60, depending on the bicycle. Accordingly, the rear crossbar clamp and the rear wheel receiver may be independently and adjustably positionable along respective lengths of the carrier base (see FIGS. 3 and 4).

A rear cap portion 78 structurally supports and spaces rails 58 and 60 at rear end 62. In some examples, rear cap portion 78 provides an aperture through which a retractable tether 80 may be retracted into and extended from one of the rails (in this example, rail 58) for securing bicycle 64 to the carrier. As depicted in FIG. 1, tether 80 may include a self-locking feature, in which a first locking portion 82 disposed at the end of the tether is lockable to a second lock portion 84 disposed on the tether. In some examples, a separate lock may be used with tether 80. First locking portion 82 may be received in a seat formed in rear cap portion 78, as depicted in FIG. 2.

A front end of bicycle 64 is also mountable to carrier 30. In this case, a front wheel 87 is selectively securable to a wheel-capture device 86 coupled to front end portion 52. Wheel-capture device 86 includes a pair of pivotable U-shaped hoop structures configured to cradle front wheel 87: a front hoop 88 and a rear hoop 90. A locking knob 92 is included for securing the hoops in position, as further described below. A security loop 94 may be affixed to rear hoop 90 for attaching a locking mechanism.

A. Wheel Capture Device

Figure 5:
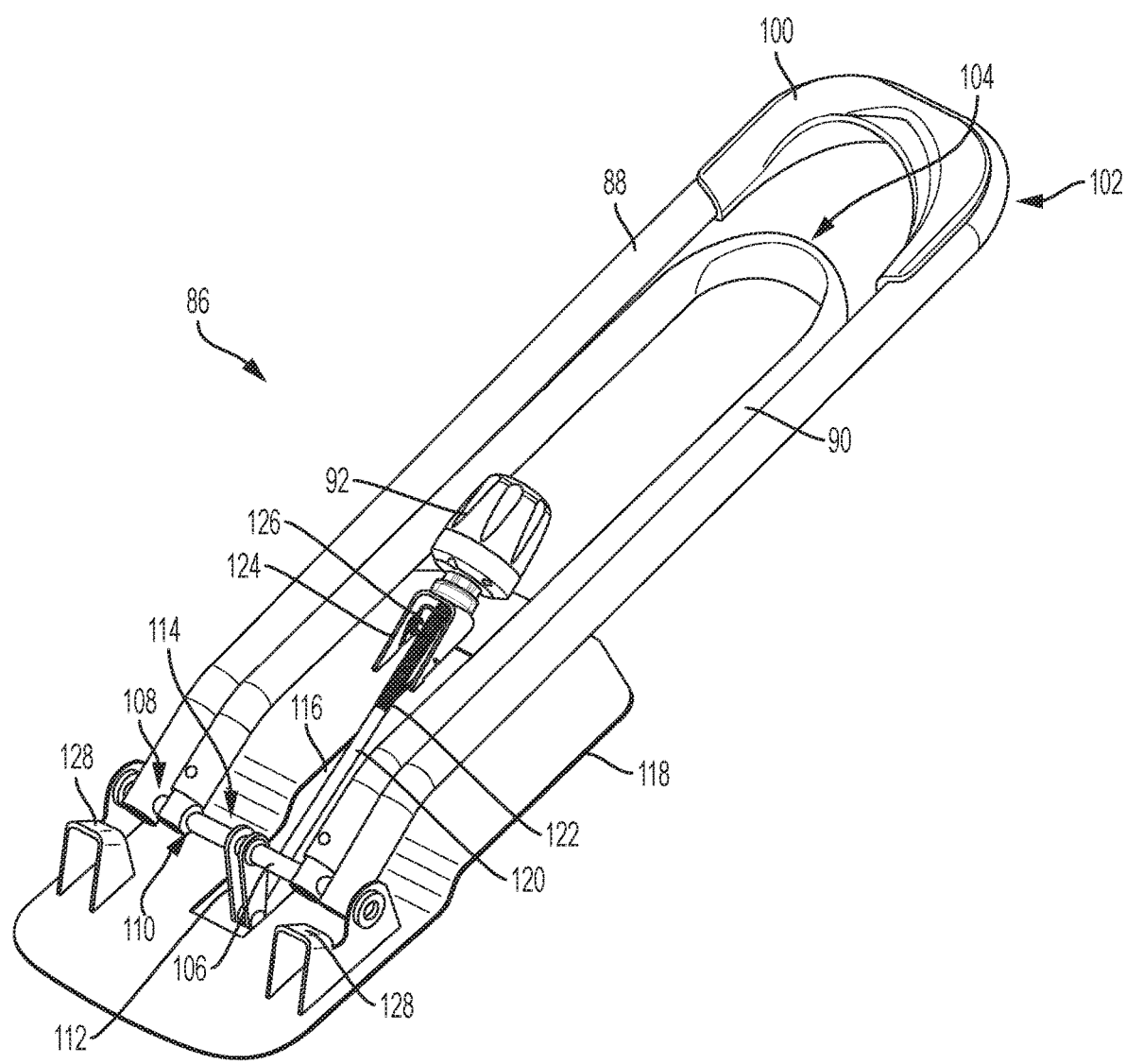
FIG. 5 is an oblique isometric view of selected components of an illustrative wheel capture device, in accordance with aspects of the present disclosure.
Figure 6:
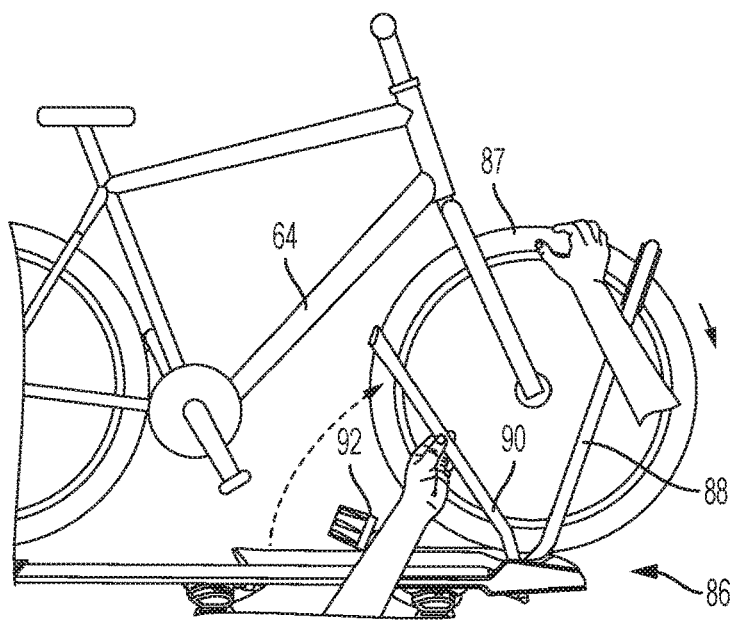
FIG. 6 and FIG. 7 are side elevation views of steps in an illustrative mounting procedure, in accordance with aspects of the present disclosure.
Figure 7:
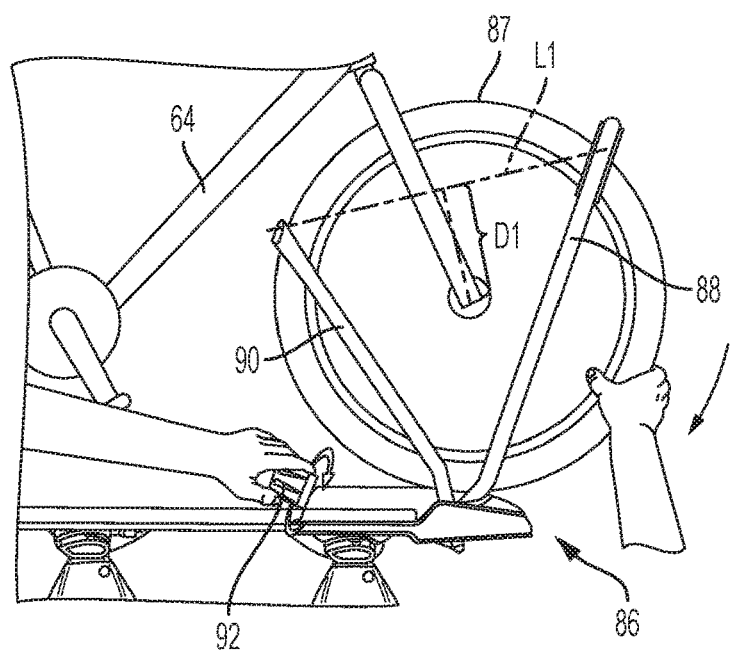

As shown in FIGS. 5-7, this section provides additional description of wheel capture device 86 features and operation. FIG. 5 is an oblique isometric view of various components of wheel capture device 86, with an outer enclosure removed to show relationships between the components. FIGS. 6 and 7 illustrate operation of the device in an exemplary use case.

As shown in FIG. 5, wheel capture device 86 includes front hoop 88 (also referred to as first hoop), which may have a shaped distal insert or spacer 100, and rear hoop 90 (also referred to as second hoop). Both of the hoop structures are pivotable such that a distal end 102 of front hoop 88 and a distal end 104 of front hoop 90 can be raised into generally upright positions to cradle front wheel 87. Front hoop 88 is pivotal around an axle 106 (at a rotatable connection 108) between a stowed position generally parallel to the base, and a use position generally upright for cradling the bicycle wheel. Rear hoop 90 is fixed (e.g., welded) to and pivotal with axle 106 between a stowed position generally parallel to the base, and a use position generally upright for cradling the bicycle wheel. In some examples, front hoop 88 may instead be fixed to axle 106 and rear hoop may be rotatable around the axle. In either case, both the front hoop and the rear hoop are pivotable around a same axis of rotation.

A lever arm 112 is also fixed (e.g., welded) to axle 106 at a fixed connection 114, extending downward through an opening 116 in a base plate 118. Base plate 118 may form a portion of base 54 of carrier 30. A threaded member 120 (also referred to as a rod) having a first end pivotally coupled to a distal end of lever arm 112, and a threaded portion 122 at a second end. The threaded portion extends generally upward and rearward through the opening in the base. Locking knob 92 (also referred to as a member) has a hole with internal threads that engage threaded end portion 122 of threaded member 120.

The threaded member and the rear hoop are configured such that pivoting the rear hoop upward causes threaded member 120 to move rearward toward the second end portion 62 of base 54. An abutment plate 124 is coupled to the base, and locking knob 92 may be tightened against plate 124, such that threaded member 120 is prevented from returning forward, thereby maintaining a position of the rear hoop.

Front hoop 88 is prevented from pivoting completely forward by a pair of mechanical stops 128. This avoids the catastrophic situation in which a mounted bicycle is allowed to roll forward off the carrier during mounting or use. Additionally, a spring wire 126 is coupled to abutment plate 124 and configured to apply elastic pressure to threaded portion 122 of rod 120. By contacting the threads of the threaded member, spring wire 126 provides a ratcheting bias against axial movement. Pivoting rear hoop 90 upward will cause threaded portion 122 to ratchet past spring wire 126. The spring wire will then apply sufficient pressure to the threads to prevent axial movement of the rod and thereby hold rear hoop 90 in position while locking knob is tightened.

Turning to FIGS. 6 and 7, a method of operation will now be described. As depicted in FIG. 6, bicycle 64 is mounted atop carrier 30 and front wheel 87 is rotated against an upright front hoop 88, which is limited to a selected angle by mechanical stops 128 as described above. Rear hoop 90 is then raised to an upright position to contact wheel 87. Doing so causes locking knob 92 to extend rearward, possibly exposing threads of threaded portion 122. The user can then let go of rear hoop 90, which is held temporarily in place by spring wire 126. To secure rear hoop 90 in its upright position, locking knob 92 is spun on threaded portion 122 and tightened against abutment plate 124. This prevents threaded member 120 from moving forward, which prevents lever arm 112 from pivoting, which prevents axle 106 from rotating, which holds rear hoop 90 in place. To facilitate tightening of locking knob 92 that is adequate but not excessive, an internal friction plate or ratcheting mechanism may be used to cause a slippage of the knob with respect to the threaded rod when sufficient torque has been achieved.

As depicted in FIG. 7, a line L1 drawn between contact points of the front and rear hoop on wheel 87 should pass above the axis of rotation of the wheel. Specifically, a distance D1 measured perpendicular from the axis to line L1 should be greater than zero. In some examples distance D1 is approximately two inches. Various different sizes of wheel 87 may be securely captured by wheel capture device 86. The front and rear hoop lengths and contours may be shaped and sized to accommodate a wide range of wheel diameters (e.g., 26 to 29 inches), tire widths (e.g., 21 C to 3.25 inches), and bike frame geometries (mid-fat mountain bike style to triathlon-style road bikes).

Previous upright bike mount designs have required an adjustment mechanism on the front hoop to accommodate bike wheels of different sizes. In contrast, disclosed bike mount configurations may be used to carry bikes having significantly different wheel dimensions, without adjusting the effective size of either hoop, primarily by increasing the size and range of movement of the rear hoop. For example, in the illustrated embodiment, the front hoop has a length of at least 60 centimeters, preferably about 67 centimeters; the rear hoop has a length of at least 50 centimeters, preferably about 55 centimeters; and a range of motion from 0 degrees to at least 70 degrees, preferably about 77 degrees. In the illustrated examples, the ratio of the rear hoop length to the front hoop length is at least about 0.8 or 8:10. By eliminating the need to properly adjust the effective length of the front hoop to match a particular bike dimension, critical user error may be controlled or eliminated, which otherwise may result in bikes falling off of vehicles at high speed.

B. Rear Wheel Receiver

As shown in FIGS. 8-11, this section describes further details regarding rear wheel receiver 66 and related features of carrier 30.

Figure 8:
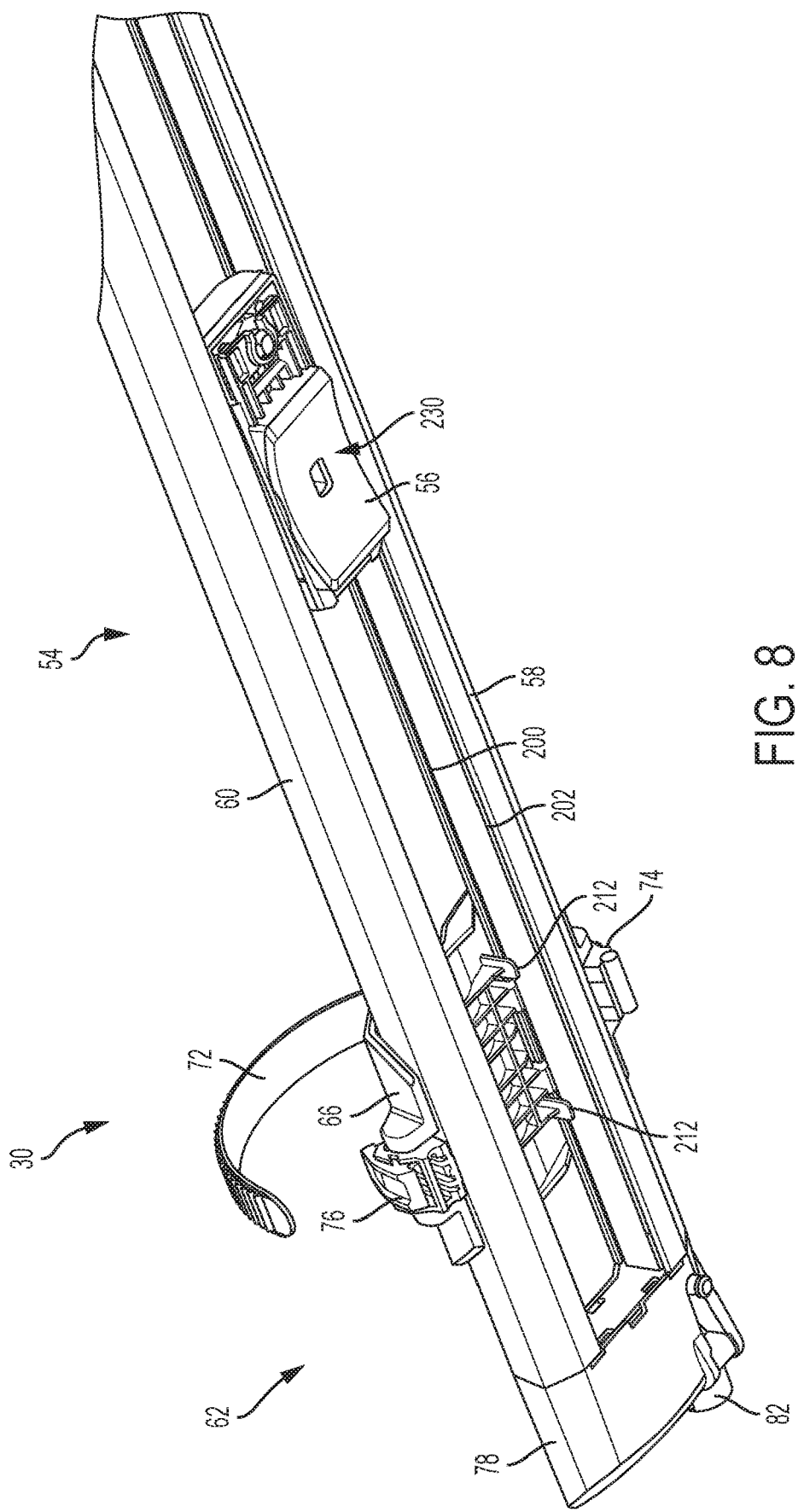
FIG. 8 is a bottom oblique view of a rear portion of the carrier of FIG. 1.

FIG. 8 is a bottom oblique view of rear end portion 62 of base 54. As depicted, rails 58 and 60 each include an upper slot 200 and a lower slot 202, each running along a length of the respective rail. Rear crossbar clamp 56 includes side tabs that ride in lower slots 202, forming a sliding or prismatic joint and facilitating lengthwise position adjustment of the clamp. Similarly, rear wheel receiver 66 includes protrusions that ride in upper slots, 200, forming a sliding or prismatic joint and facilitating lengthwise position adjustment of the wheel receiver. The rear clamp and the rear wheel receiver are configured such that the two components do not interfere with each other, so the receiver and clamp can slide past each other in their respective slots, allowing position adjustment within overlapping ranges.

Figure 9:
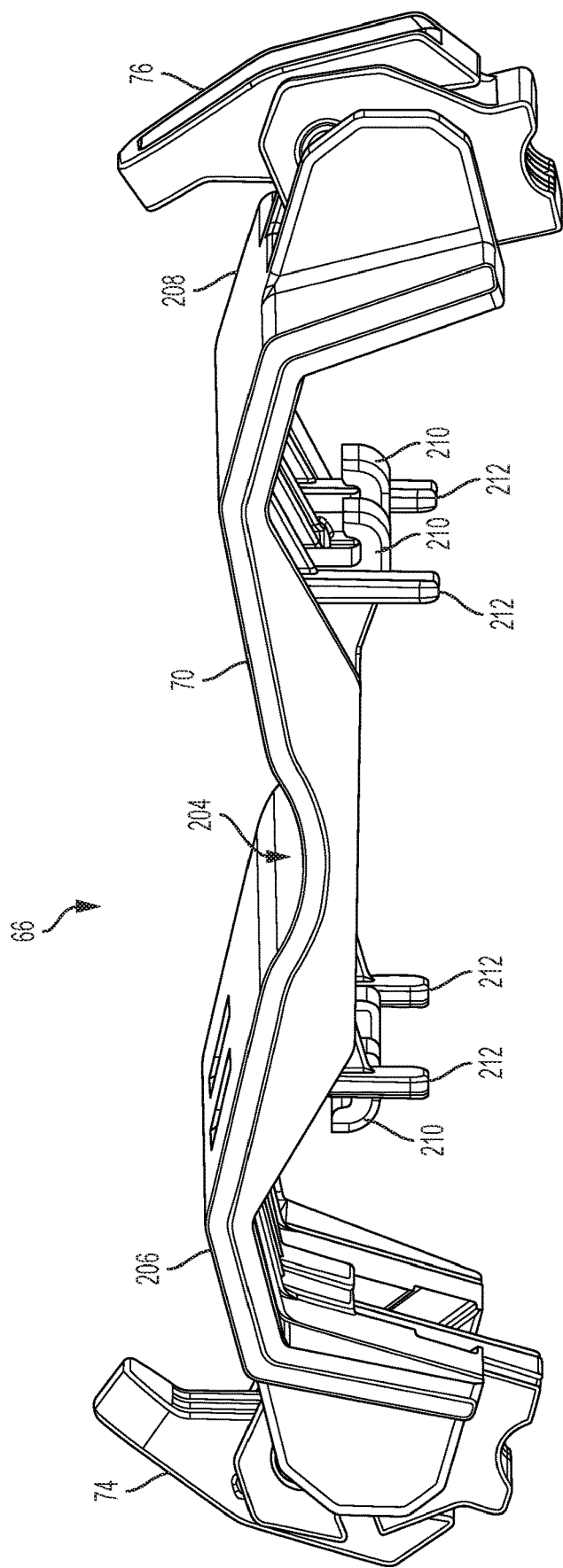
FIG. 9 is an isometric view of an illustrative rear wheel receiver portion suitable for use on the carrier of FIG. 1.

FIG. 9 is an isometric view of an isolated portion of rear wheel receiver 66. The rear wheel receiver includes wheel support plate 70 having a central concavity 204 configured to receive rear wheel 68 of the bicycle thereon. Plate 70 extends laterally outward and downward, forming side wing portions 206 and 208 configured to overlay rails 58 and 60 in sliding contact. Wing portions 206 and 208 also support side buckles 74 and 76 for ratcheting and release of strap 72. On an under-surface of the rear wheel receiver, four protrusions 210 extend downward and outward, two on either side of the centerline. Protrusions 210 may include any suitable structures configured to engage slots 200. In this example, protrusions 210 are J-shaped protrusions or hooks configured to insert into slots 200 and prevent upward movement or removal. The receiver also includes a plurality of alignment tabs 212 adjacent protrusions 210, configured to abut and slide along the inner walls of rails 58 and 60.

Figure 10:
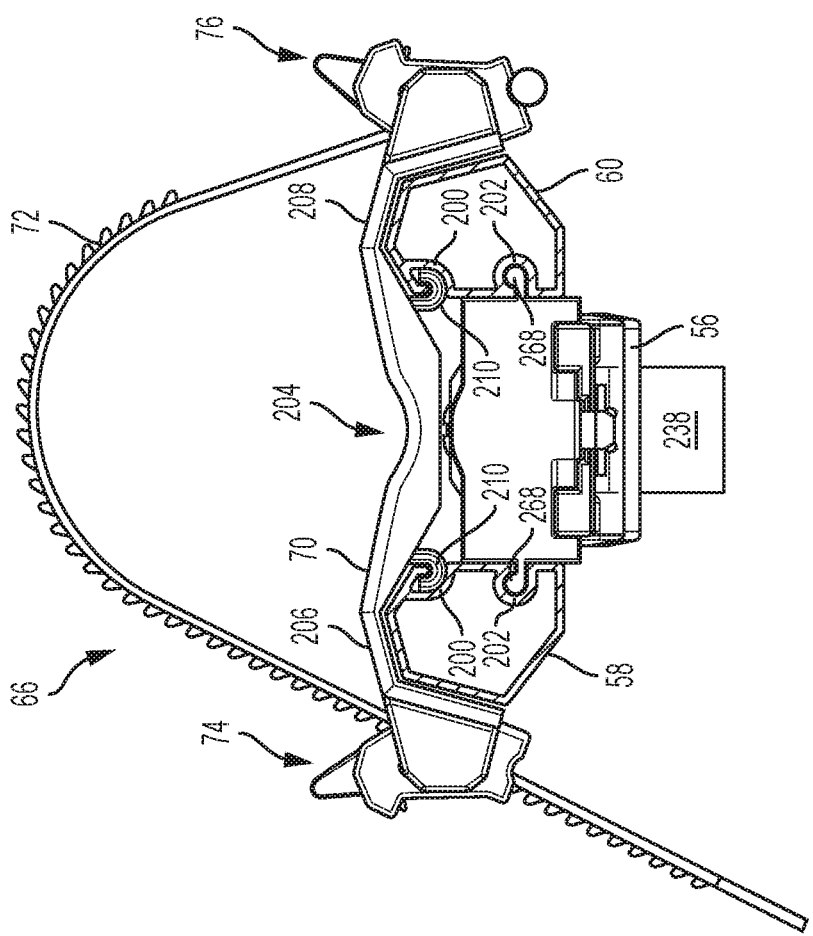
FIG. 10 is a rear elevation sectional view through rail portions of the carrier of FIG. 1, showing relationships between the rails, the wheel receiver, and a rear crossbar clamp.
Figure 12:
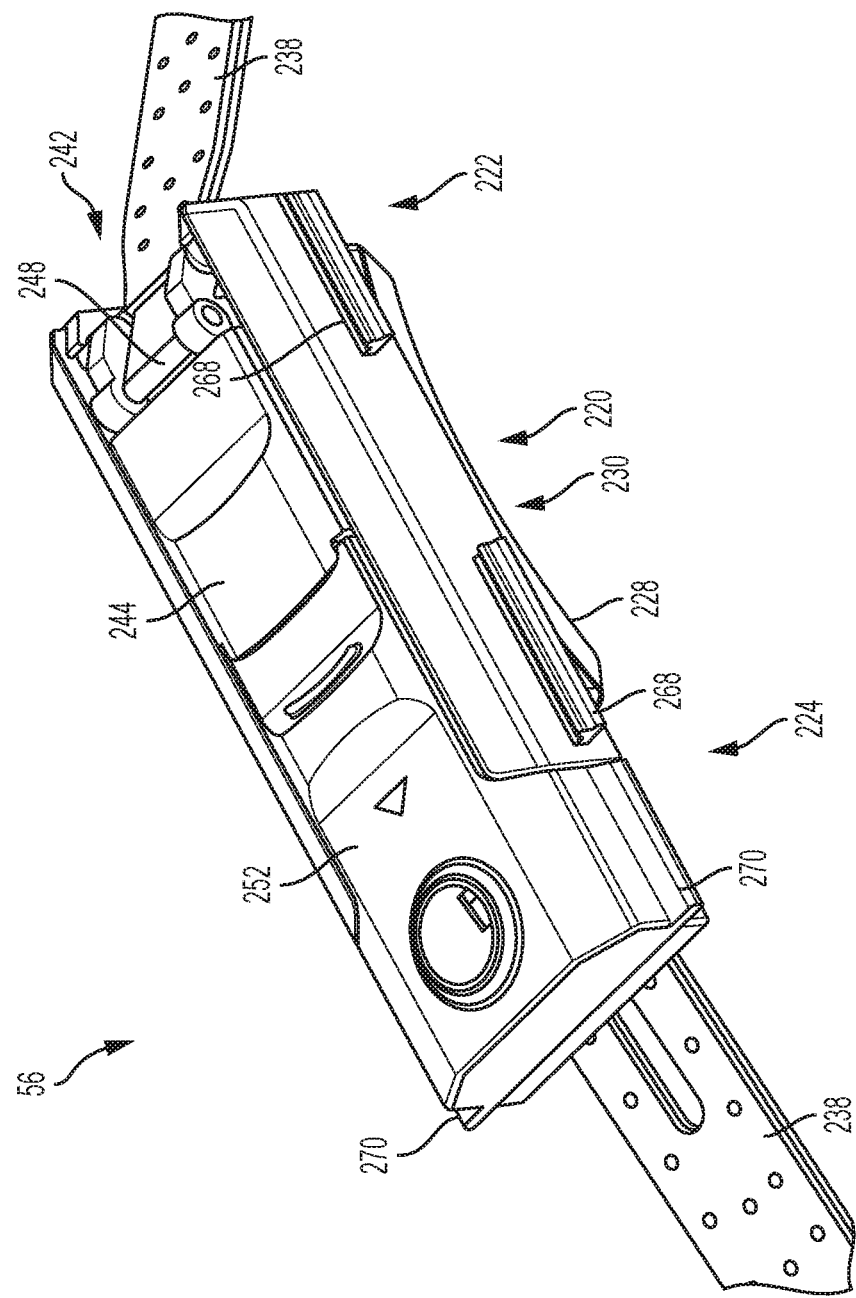
FIG. 12 is an oblique isometric view of an illustrative strap-type crossbar clamp according to the present teachings.

FIG. 10 is a sectional view through rails 58 and 60, showing the relationships between rails 58 and 60, slots 200 and 202, and rear wheel receiver 66 and rear crossbar clamp 56. As depicted, rear wheel receiver 66 rides atop rails 58 and 60, and is engaged with the upper slots via protrusions 210. Below the wheel receiver, rear crossbar clamp 56 is engaged with the lower slots via its side tabs, described further below.

Figure 11:
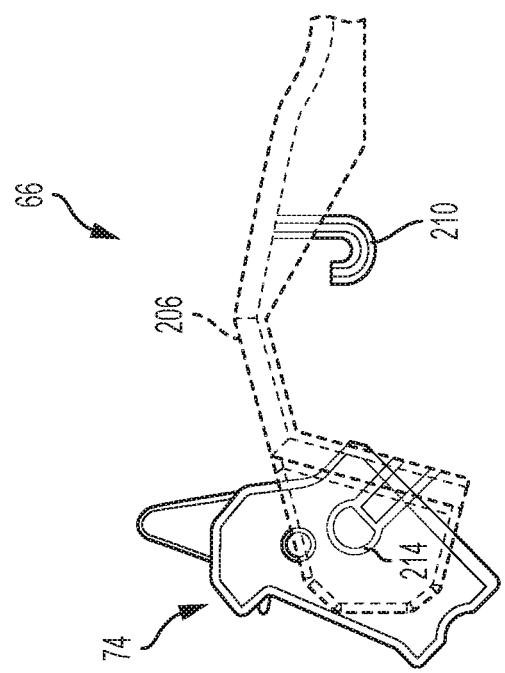
FIG. 11 is a partial, semi-transparent view of an illustrative buckle arrangement of a rear wheel receiver of the carrier of FIG. 1.

FIG. 11 is a partial detail view showing how the strap buckles (in this case buckle 74) are pivotable within their mounts on side wings 206 and 208. An axle portion 214 may, e.g., twist flexibly to permit this pivoting. This feature facilitates securing of a wider range of wheel and tire sizes.

C. Crossbar Clamps

As shown in FIGS. 12-20, this section provides further description regarding front crossbar clamps 48 and 50, as well as rear crossbar clamp 56. FIG. 12-16 depict various features of the clamps Crossbar clamps 48, 50, and 56 of carrier 30 may include any suitable crossbar clamps, including clamshell-style, linear-style, and strap-style clamps. The examples described below are strap-style clamps, but other types of clamps may be used, including a combination of styles. Furthermore, the strap-style of crossbar clamps described below may be used independently of carrier 30, e.g., on a different style or type of bicycle carrier, other equipment carrier, or adapter used with a vehicle rack having crossbars. In general, the strap clamps described herein may be used in any appropriate application.

Figure 16:
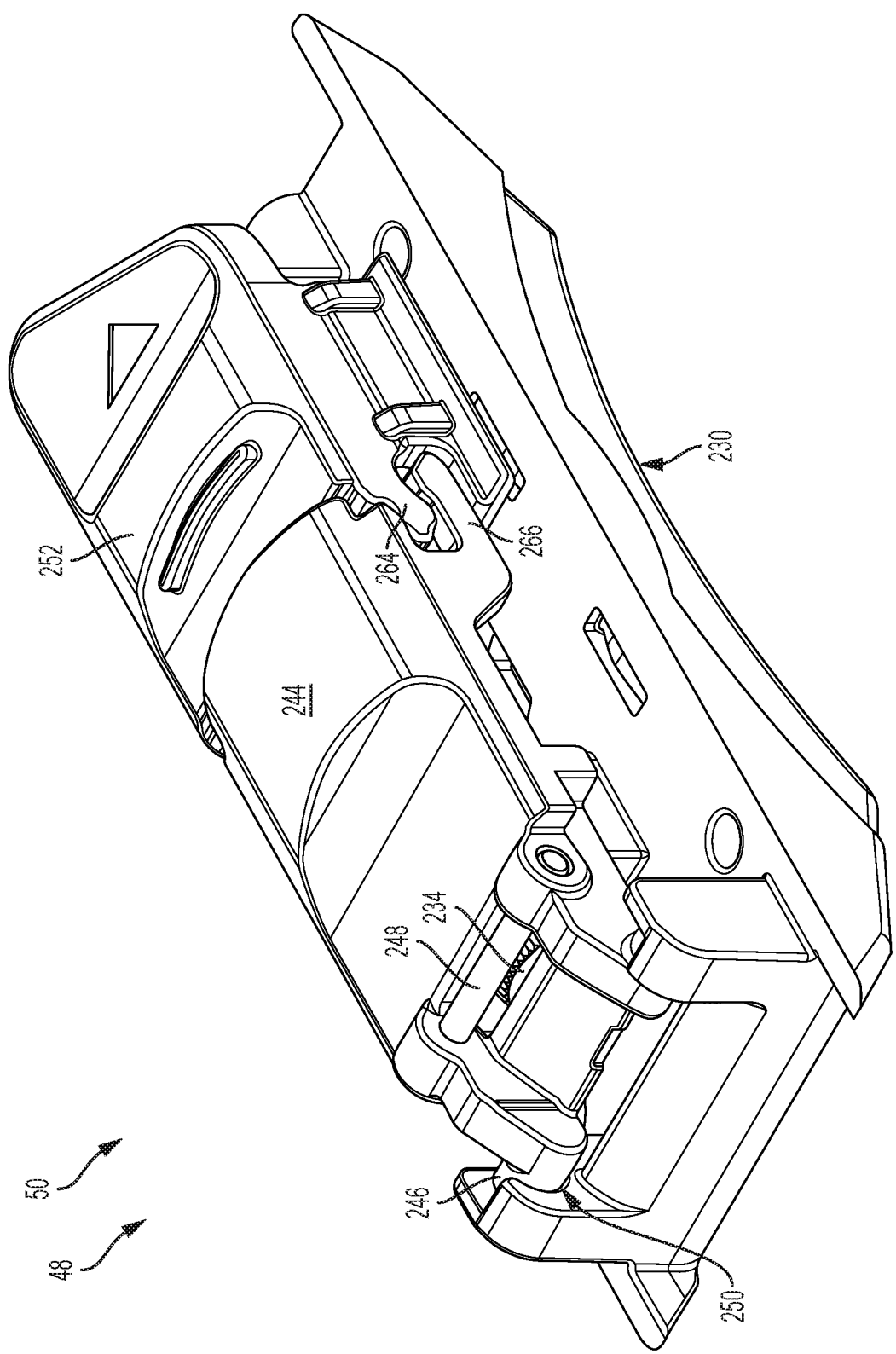
FIG. 16 is oblique isometric view of another illustrative strap-type crossbar clamp according to the present teachings.

FIGS. 12-15 depict various aspects of rear crossbar clamp 56, which comprises a positionable, adjustable, and lockable strap clamp. FIG. 16 shows crossbar clamp 48 (identical to crossbar clamp 50), which does not include the positionable and lockable features of clamp 56. FIGS. 17-20 depict various steps common to the operation of all of these clamps.

With reference to FIGS. 12-20, functionally similar components of crossbar clamps 48, 50, and 56 will be described simultaneously and labeled accordingly. Where crossbar clamp 56 differs from the front crossbar clamps, these differences will be called out and labeled separately. Absent any such specificity, clamps 48, 50, and 56 should be understood to include functionally identical or substantially similar components.

Crossbar clamps 48, 50, 56 each include a body 220 including a first end portion 222, a second end portion 224, an upper portion 226, and a lower portion 228 having a cushioned concave surface 230 configured to contact a top side of the crossbar. A threaded rod 232 is rotatably coupled to upper portion 226 of body 220. Threaded rod 232 has a dial 234 that is manipulable to rotate the rod. A traveling member 236 (e.g., a barrel nut) is in threaded engagement with rod 232 and travels along the rod in response to rotation thereof.

A flexible strap 238 (see especially FIG. 15) has a proximal end 240 coupled to traveling member 236 such that the flexible strap is coupled to the first end portion of the body. Strap 238 has an effective length that can be lengthened or shortened, as described below, to fit the crossbar. A distal end 242 of strap 238 is coupled to a lever plate 244 (also referred to as an over-center plate). Lever plate 244 has a transverse shaft portion 246, which may comprise two lateral extensions. Distal end 242 of strap 238 is pivotally attached to lever plate 244 by a mounting pin 248 disposed adjacent shaft portion 246. Mounting pin 248 is spaced from the shaft portion along a length of the lever plate, facilitating an over-center mechanism when securing the lever plate to body 220. Second end portion 224 of the body includes a slot 250 configured to receive shaft portion 246 of the lever plate for this purpose, such that the lever plate is releasably engageable with the second end portion.

Rotation of dial 234 causes the traveling member to move along rod 232, causing more or less of strap 238 to be housed within body 220, thereby altering the effective length of the strap. This may be done, for example, to adapt strap 238 to differently-sized crossbars. Lever plate 244 is also pivotably transitionable, when shaft portion 246 is seated in slot 250, between an open position 258 and a closed position 260, such that transitioning from the open position to the closed position causes an over-center action and a decrease in the effective length of the flexible strap. This facilitates tightening of the strap around the crossbar.

A cover plate 252 is coupled to first end portion 222 of the body. Cover plate 252 is slidable along the body between a first position 254 and a second position 256. (See FIGS. 17-18). Cover plate 252 blocks lever plate 244 from opening when the lever plate is in closed position 260 and the cover plate is in first position 254. Accordingly, the lever plate is prevented by the cover plate from transitioning to the open position until the cover plate is slid into second position 256. In some examples, respective opposing ends of cover plate 252 and lever plate 244 include finger portions 262 configured to interdigitate when the the lever plate is in the closed position and the cover plate is in the first position, such that the cover plate and the lever plate are interlockable. For example, lever plate 244 includes finger portions 264 configured to interlock with finger portions 266 on cover plate 252.

Body 220 includes a pair of side walls 267 extending from the first end portion to the second end portion, the pair of side walls configured to prevent access to threaded rod 232. (Lever plate 244 is also configured to prevent access to the dial and threaded rod). With respect to rear crossbar clamp 56 only, body 220 may include side tabs 268, e.g., on walls 267 (See FIG. 12-14). Side tabs 268 may include any suitable protrusions or other structures configured to interface with lower slots 202 of rails 58 and 60, forming a prismatic or sliding joint. In some examples, side tabs may be reverse-tapered or shaped to facilitate retention of the tabs within the slots. Cover plate 252 may include its own side tabs 270, to retain the cover plate in the slots and to facilitate sliding of the cover plate between first and second positions. This arrangement facilitates adjustability of the position of the clamp device relative to the carrier (or other rack accessory) along a length of the slots. In some examples, only one slot is used. In some examples, only one tab 268 is present.

Figure 13:
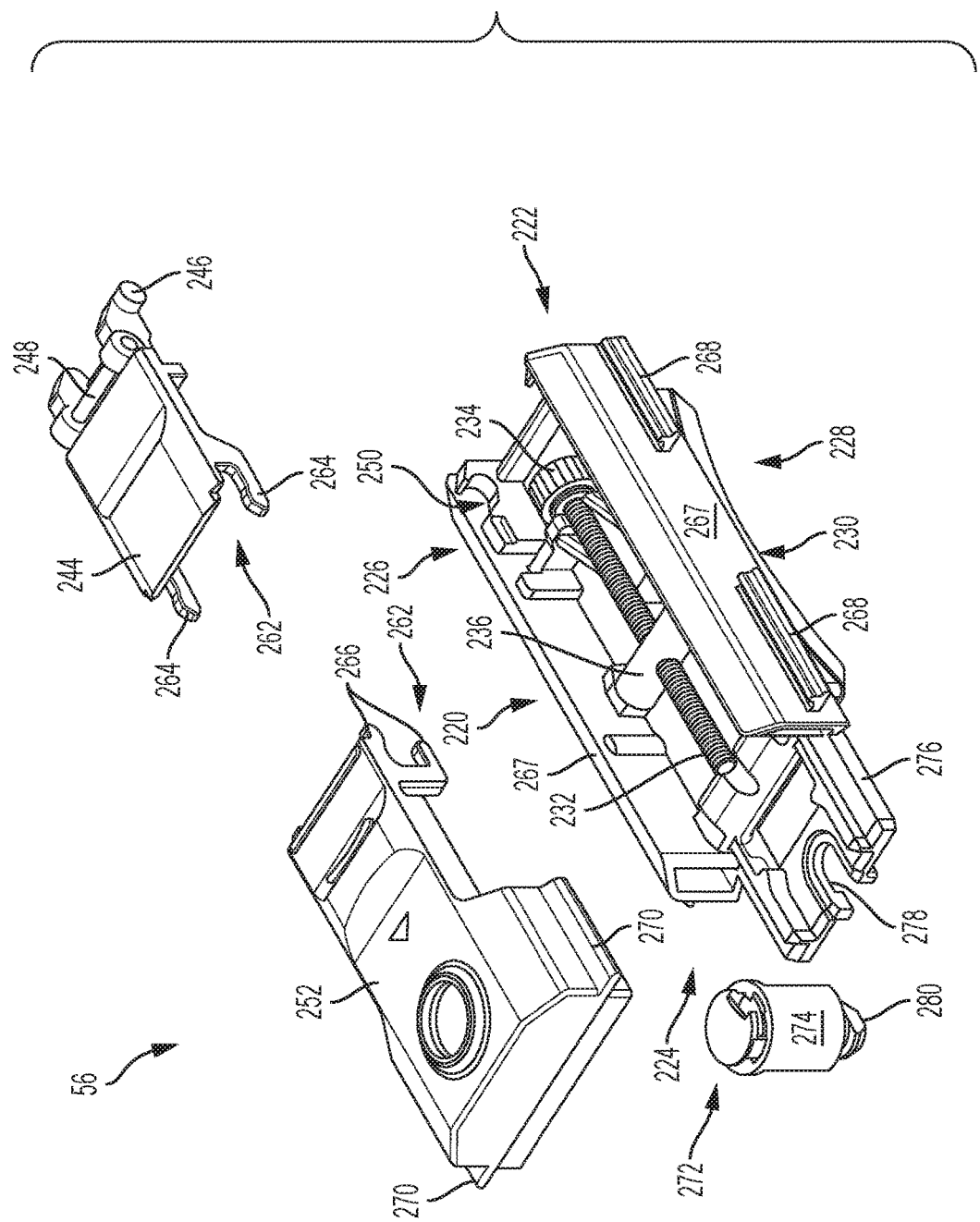
FIG. 13 and FIG. 14 are exploded views of the clamp of FIG. 12.
Figure 14:
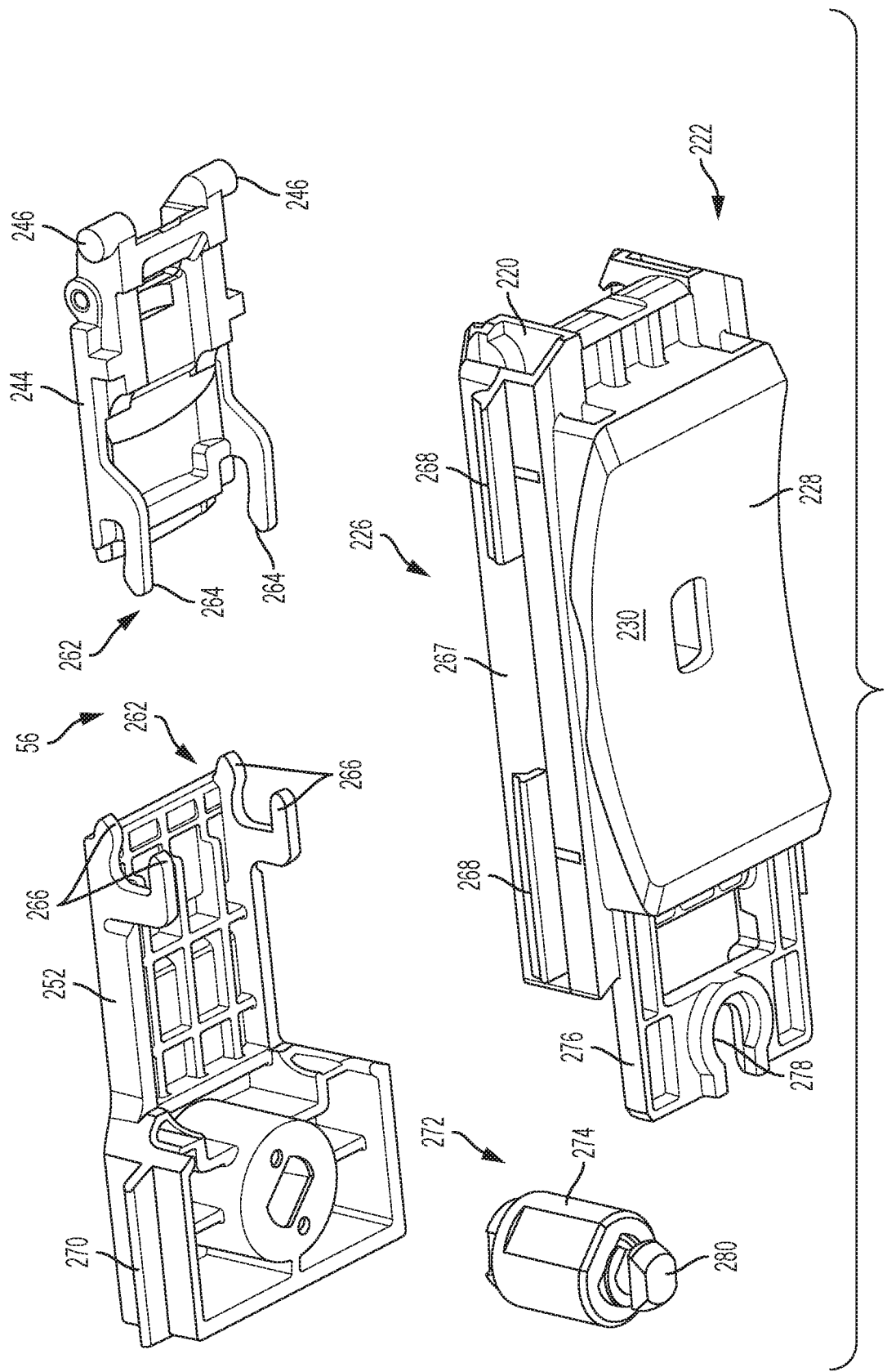
Figure 15:
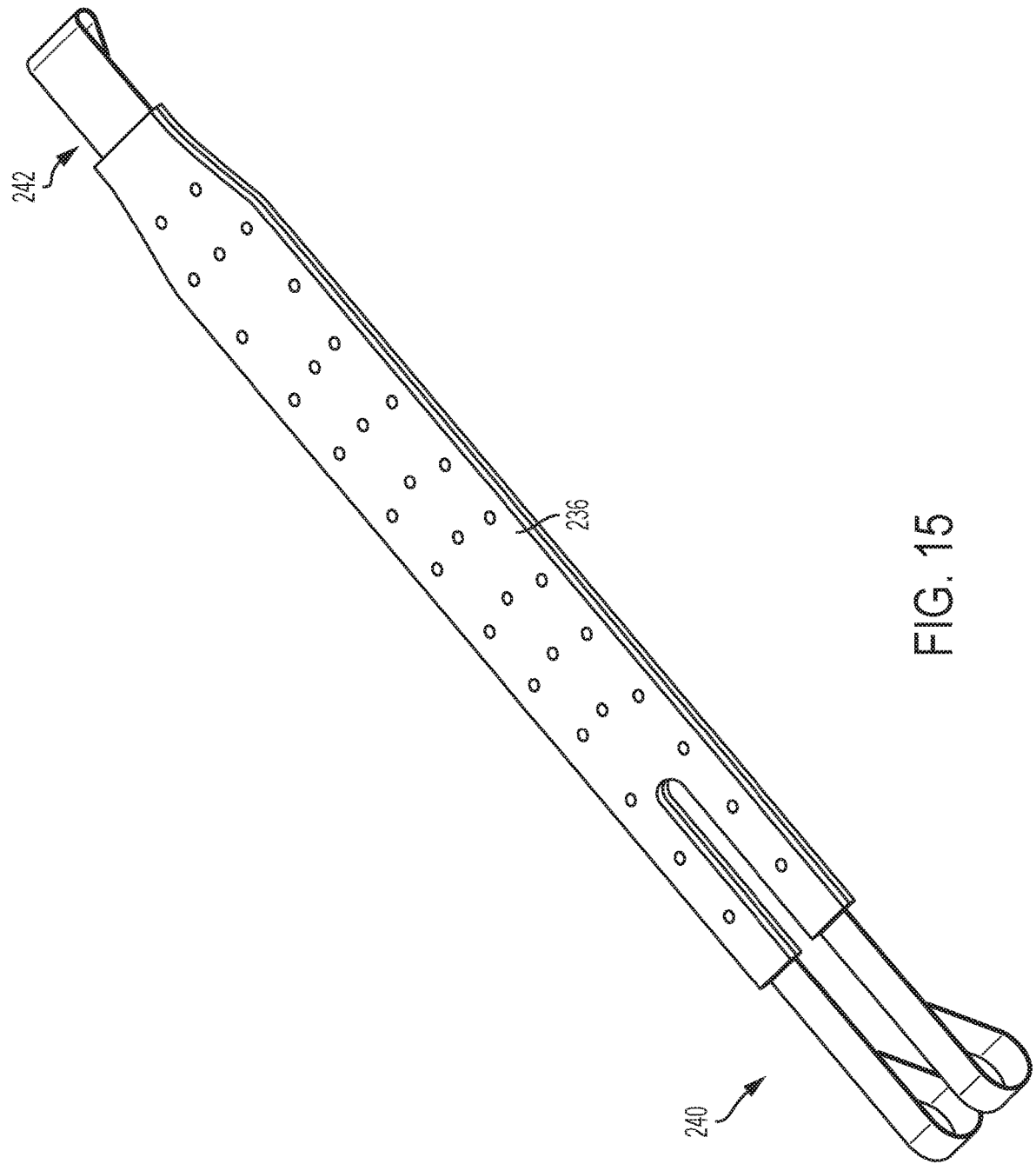
FIG. 15 is an isometric view of an illustrative flexible strap suitable for use in a strap-type crossbar clamp according to the present teachings.

Also with respect to rear crossbar clamp 56 only, a locking mechanism 272 may be included and configured to selectively lock the cover plate 252 in first position 254. Locking mechanism 272 may be present in any crossbar clamp, but a selected one of the clamps may be sufficient to secure the entire carrier. Locking mechanism 272 may be configured to selectively lock cover plate 252 to lower portion 228 of body 220 (or an extension thereof). For example, as shown in FIGS. 13-14, cover plate 252 may include a lock cylinder 274 and the lower portion of body 220 may include an extension plate 276 having an aperture 278 configured to mate with a cam 280 of lock cylinder 274.

Figure 17:
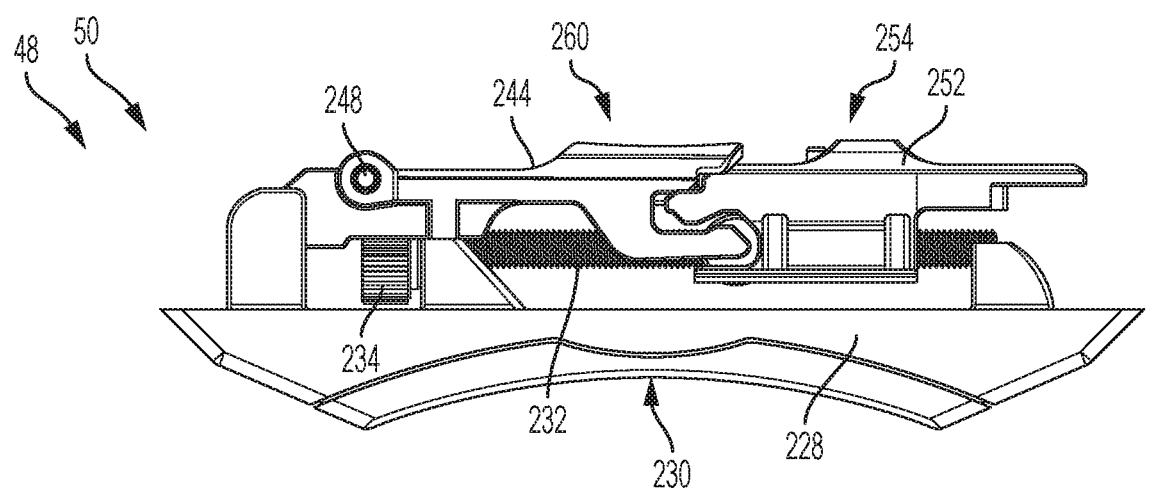
FIGS. 17 through 19 are side elevation views of various configurations of the clamp of FIG. 16, during a series of operational steps.

With specific reference to FIGS. 17-20, aspects of operation of the clamps will now be described. In FIG. 17, lever plate 244 is in closed position 260 and cover plate 252 is in first position 254, such that fingers 264 and 266 are interlocked and lever plate 244 is prevented from opening. In this position, the strap (not shown here) will be tightened on the crossbar clamp and secured by the over-center action of the lever arm and the securing function of the cover plate.

Figure 18:
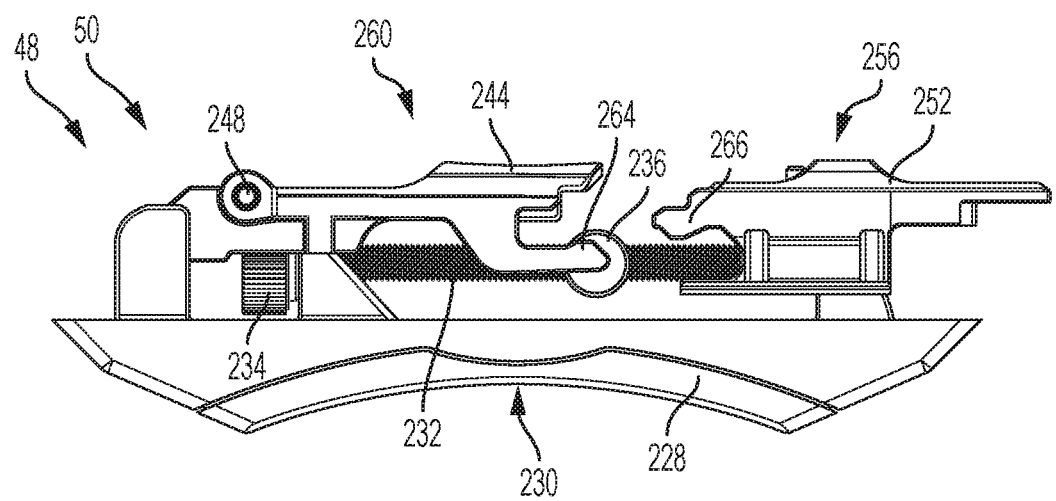
Figure 19:
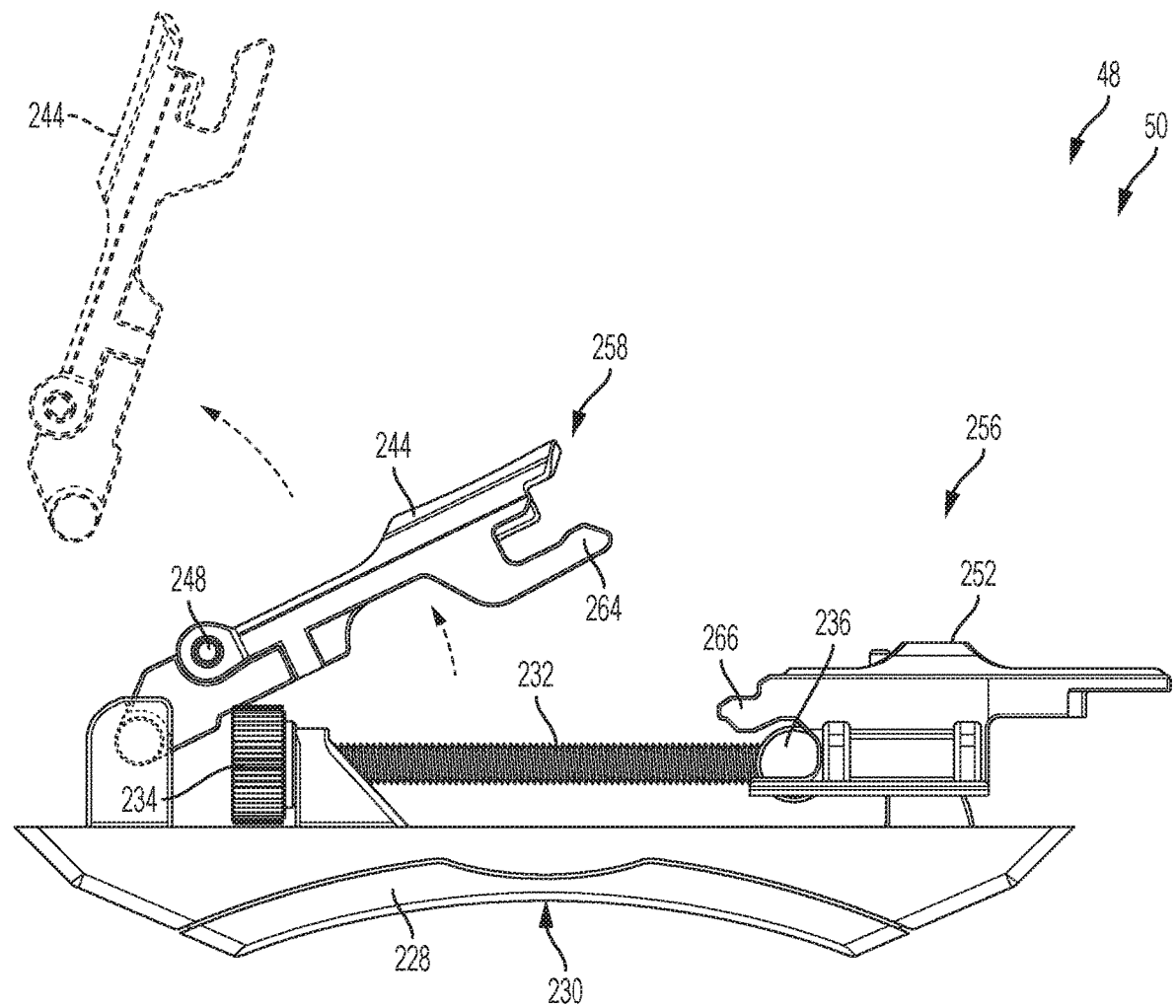
Figure 20:
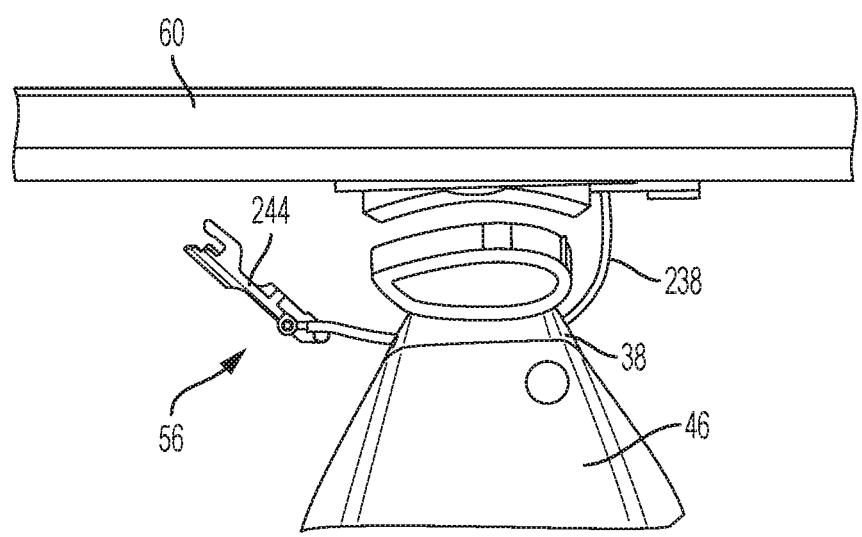
FIG. 20 is a side elevation view of the clamp of FIG. 12 partially installed on an illustrative crossbar, in accordance with aspects of the present disclosure.

In FIG. 18, cover plate 252 is slid into second position 256, such that the cover plate is no longer interlocked with lever plate 244. In FIG. 19, lever plate 244 is shown pivoting into open position 258 and being removed from body 220 (see dashed-outline of lever plate 244, indicated at 244'). FIG. 20 shows lever plate 244 being further passed around front crossbar 36 to remove carrier 30 from the vehicle rack.

These operations are reversible and repeatable, for selectively removing and securing carrier 30 with respect to the crossbar. For example, clamping onto crossbar 36 involves reversing the sequence of events, such that strap 238 and lever plate 244 are passed around crossbar 36 (see FIG. 20), shaft portion 246 is inserted into slot 250, and lever plate 244 is pivoted downward into closed position 260 (see FIG. 19), tightening strap 238 on the crossbar. Cover plate 252 is then slid from second position 256 to interlock with lever plate 244 in first position 254 (see FIGS. 18 and 17).

D. Additional Examples and Illustrative Combinations

This section describes additional aspects and features of upright bicycle carriers according to the present teachings, and related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A clamp device for connecting a rack accessory to a crossbar on top of a vehicle, the clamp device comprising:

a body including a first end portion, a second end portion, an upper portion, and a lower portion having a cushioned concave surface configured to contact a top side of the crossbar;

a threaded rod rotatably coupled to the upper portion of the body, the threaded rod having a dial manipulable to rotate the rod, and a traveling member in threaded engagement with the rod;

a flexible strap having an effective length and a proximal end coupled to the traveling member such that the flexible strap is coupled to the first end portion of the body;

a distal end of the flexible strap coupled to a lever plate having a transverse shaft portion;

the second end portion of the body including a slot configured to receive the shaft portion of the lever plate, such that the lever plate is releasably engageable with the second end portion; and a cover plate coupled to the first end portion of the body, the cover plate being slidable along the body between a first position and a second position;

wherein rotation of the dial causes alteration of the effective length of the flexible strap;

wherein the lever plate is pivotably transitionable, when the shaft portion is seated in the slot, between an open position and a closed position, such that transitioning from the open position to the closed position causes a decrease in the effective length of the flexible strap; and wherein the cover plate blocks the lever plate from opening when the lever plate is in the closed position and the cover plate is in the first position, such that the lever plate is prevented by the cover plate from transitioning to the open position until the cover plate is in the second position.

A1. The clamp device of paragraph A0, further comprising:

a first tab on a first lateral side of the body, the tab configured to form a prismatic joint with a corresponding slot in the rack accessory;

wherein a position of the clamp device relative to the rack accessory is adjustable along a length of the slot.

A2. The clamp device of any of paragraphs A0 through A1, wherein respective opposing ends of the cover plate and the lever plate include finger portions configured to interdigitate when the lever plate is in the closed position and the cover plate is in the first position, such that the cover plate and the lever plate are interlockable.

A3. The clamp device of any of paragraphs A0 through A2, further comprising a locking mechanism configured to selectively lock the cover plate in the first position.

A4. The clamp device of paragraph A3, wherein the locking mechanism is configured to selectively lock the cover plate to the lower portion of the body.

A5. The clamp device of paragraph A4, wherein the cover plate comprises a lock cylinder and the lower portion of the body comprises an extension plate having an aperture configured to mate with a cam of the lock cylinder.

A6. The clamp device of any of paragraphs A0 through A5, wherein the body includes a pair of side walls extending from the first end portion to the second end portion, the pair of side walls configured to prevent access to the threaded rod.

B0. A bicycle carrier for carrying a bicycle on a vehicle rack, the bicycle carrier comprising:

an elongate base having a first end portion, a second end portion, and a pair of rails running generally parallel to a long axis of the base between the first end portion and the second end portion, each of the rails having an upper slot and a lower slot, each of the slots running along a respective length of the rail;

a first bicycle mounting device coupled to the first end portion of the base and configured to secure a first portion of a bicycle to the bicycle carrier;

a first crossbar clamp coupled to the base adjacent the first bicycle securing device, the first crossbar clamp configured to clamp onto a first crossbar mounted to a vehicle rooftop;

a wheel receiver adjustably coupled to at least one of the upper slots of the pair of rails and configured to secure a wheel of the bicycle to the bicycle carrier; and a second crossbar clamp adjustably coupled to at least one of the lower slots of the pair of rails and configured to clamp a second crossbar mounted to the vehicle rooftop;

wherein the wheel receiver and the second crossbar clamp are adjustable along an overlapping range of positions with respect to the pair of rails.

B1. The bicycle carrier of paragraph B0, wherein the second crossbar clamp comprises a pair of lateral tabs each in sliding engagement with a respective one of the lower slots.

B2. The bicycle carrier of paragraph B1, wherein each of the lateral tabs has a proximal portion adjacent a mouth of the lower slot and a distal portion encompassed by the lower slot, the distal portion being larger than the proximal portion.

B3. The bicycle carrier of any of paragraphs B0 through B2, wherein the wheel receiver comprises a wheel tray disposed above the pair of rails and a pair of protrusions each in sliding engagement with a respective one of the upper slots.

B4. The bicycle carrier of any of paragraphs B0 through B3, wherein each of the rails has a respective inner wall, and each upper slot is disposed in a respective one of the inner walls.

B5. The bicycle carrier of paragraph B4, wherein each lower slot is disposed in a respective one of the inner walls.

C0. A bicycle mount for carrying a bicycle on top of a vehicle comprising:

an elongate base having a first end portion, a second end portion, and a pair of rails running generally parallel to a long axis of the base between the first end portion and the second end portion;

a first clamp device coupled to the base and configured to clamp a first crossbar disposed on a vehicle; and a wheel-capture device coupled to the first end portion of the base, the wheel-capture device including:

a first hoop structure pivotal around an axle between a stowed position generally parallel to the base, and a use position generally upright for cradling a bicycle wheel, a second hoop structure fixed to and pivotal with the axle between a stowed position generally parallel to the base, and a use position generally upright for cradling the bicycle wheel, a lever arm fixed to the axle and extending downward through an opening in the base;

a threaded member having a first end portion and a second end portion, the first end portion of the threaded member being pivotally coupled to a distal end of the lever arm, the second end portion of the threaded member being threaded and extending generally upward through the opening in the base, and a locking knob having a hole with internal threads engaging the threaded end portion of the threaded member, the threaded member and actuator configured such that threads of the threaded member are visibly exposed when the second hoop structure is pivoted upward, causing the threaded member to move rearward toward the second end portion of the base; and an abutment plate coupled to the base and against which the locking knob is configured to be tightened, preventing the second hoop from lowering.

C1. The bicycle mount of paragraph C0, further comprising a spring wire coupled to the abutment plate, the spring wire configured to contact the threads of the threaded member, biasing the threaded member against axial movement and holding the second hoop in place.

C2. The bicycle mount of any of paragraphs C0 through C1, further comprising a rear wheel receiver adjustably coupled to the base adjacent the second end portion, the rear wheel receiver including a bicycle wheel support structure, a strap configured to releasably secure the wheel to the wheel support structure, and at least one protrusion forming a first prismatic joint with a first slot running along a length of a respective one of the rails of the elongate base.

C3. The bicycle mount of paragraph C2, wherein the first clamp device is fixed with respect to the base, the bicycle mount further comprising a second crossbar clamp adjustably coupled to the base by at least one second protrusion forming a second prismatic joint with a second slot running along a length of a respective one of the rails of the elongate base.

C4. The bicycle mount of paragraph C3, wherein the rear wheel receiver and the second crossbar clamp are configured to slide past each other without interference, such that the rear wheel receiver and the second crossbar clamp are adjustable along overlapping ranges of the elongate base.

D0. A bicycle carrier for carrying a bicycle on a vehicle rack, the bicycle carrier comprising:
  an elongate base having a first end portion, a second end portion;
  a first bicycle mounting device connected to the first end portion of the base, including a front hoop and a rear hoop configured to cooperatively grip the front wheel of a bicycle, each hoop having a collapsed position and a carrying position, each of the hoops having a length, the length of the rear hoop being at least about 80% of the length of the front hoop;
  a first crossbar clamp coupled to the base adjacent the first bicycle securing device, the first crossbar clamp configured to clamp onto a first crossbar mounted to a vehicle rooftop;
  a rear wheel receiver adjustably coupled to the second end portion of the base configured to secure a rear wheel of a bicycle; and
  a second crossbar clamp adjustably coupled to the base, and configured to clamp a second crossbar mounted to the vehicle rooftop.

D1. The bicycle carrier of paragraph D0, wherein the rear hoop has a length of at least about 50 centimeters.

D2. The bicycle carrier of any of paragraphs D0 through D1, wherein the rear hoop has a range of motion of from zero to at least about 70 degrees.

D3. The bicycle carrier of any of paragraphs D0 through D2, wherein the front and rear hoop rotate around the same axis.

D4. The bicycle carrier of any of paragraphs D0 through D3, wherein the front hoop has a length of at least about 60 centimeters.

D5. The bicycle carrier of any of paragraphs D0 through D4, wherein the front hoop has a nonadjustable length.

D6. The bicycle carrier of any of paragraphs D0 through D5, wherein the rear hoop has a range of motion of at least about 77 degrees.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A clamp device for connecting a rack accessory to a crossbar on top of a vehicle, the clamp device comprising: a body including a first end portion, a second end portion, an upper portion, and a lower portion having a cushioned concave surface configured to contact a top side of the crossbar; a threaded rod rotatably coupled to the upper portion of the body, the threaded rod having a dial manipulate to rotate the rod, and a traveling member in threaded engagement with the rod; a flexible strap having an effective length and a proximal end coupled to the traveling member such that the flexible strap is coupled to the first end portion of the body; a distal end of the flexible strap coupled to a lever plate having a transverse shaft portion; the second end portion of the body including a slot configured to receive the shaft portion of the lever plate, such that the lever plate is releasably engageable with the second end portion; and a cover plate coupled to the first end portion of the body, wherein the cover plate slides in a linear direction toward the lever plate, the cover plate being slidable along the body between a first position and a second position; wherein rotation of the dial causes alteration of the effective length of the flexible strap; wherein the lever plate is pivotably transitionable, when the shaft portion is seated in the slot, between an open position and a closed position, such that transitioning from the open position to the closed position causes a decrease in the effective length of the flexible strap; and wherein the cover plate blocks the lever plate from opening when the lever plate is in the closed position and the cover plate is in the first position, such that the lever plate is prevented by the cover plate from transitioning to the open position until the cover plate is in the second position.

2. The clamp device of claim 1, further comprising:
  a first tab on a first lateral side of the body, the tab configured to form a prismatic joint with a corresponding slot in the rack accessory;
  wherein a position of the clamp device relative to the rack accessory is adjustable along a length of the slot.

3. The clamp device of claim 1, wherein respective opposing ends of the cover plate and the lever plate include finger portions configured to interdigitate when the lever plate is in the closed position and the cover plate is in the first position, such that the cover plate and the lever plate are interlockable.

4. The clamp device of claim 1, further comprising a locking mechanism configured to selectively lock the cover plate in the first position.

5. The clamp device of claim 4, wherein the locking mechanism is configured to selectively lock the cover plate to the lower portion of the body.

6. The clamp device of claim 5, wherein the cover plate comprises a lock cylinder and the lower portion of the body comprises an extension plate having an aperture configured to mate with a cam of the lock cylinder.

7. The clamp device of claim 1, wherein the body includes a pair of side walls extending from the first end portion to the second end portion, the pair of side walls configured to prevent access to the threaded rod.

8. The clamp device of claim 1, wherein the cover plate slides in a direction parallel to a direction of vehicle travel.

* * * * *